(12) United States Patent
Mikolajczuk

(10) Patent No.: US 12,531,867 B2
(45) Date of Patent: Jan. 20, 2026

(54) SYSTEM AGGREGATOR AND PROJECT ROLE VERIFICATION SYSTEM

(71) Applicant: Cirqle Inc., Woodland, CA (US)

(72) Inventor: Adam Mikolajczuk, Los Angeles, CA (US)

(73) Assignee: Cirqle, Inc., Woodland Hills, CA (US)

( * ) Notice: Subject to any disclaimer, the term of this patent is extended or adjusted under 35 U.S.C. 154(b) by 242 days.

(21) Appl. No.: 18/112,276

(22) Filed: Feb. 21, 2023

(65) Prior Publication Data

US 2023/0336558 A1    Oct. 19, 2023

Related U.S. Application Data

(60) Provisional application No. 63/312,009, filed on Feb. 19, 2022.

(51) Int. Cl.
*H04L 9/40* (2022.01)

(52) U.S. Cl.
CPC .......... *H04L 63/102* (2013.01); *H04L 63/101* (2013.01)

(58) Field of Classification Search
CPC ............................ H04L 63/102; H04L 63/101
See application file for complete search history.

(56) References Cited

U.S. PATENT DOCUMENTS

| | | | |
|---|---|---|---|
| 2005/0055231 A1* | 3/2005 | Lee | G06Q 10/1053 705/321 |
| 2008/0140680 A1* | 6/2008 | Hyder | G06Q 10/00 |
| 2009/0150166 A1* | 6/2009 | Leite | G06Q 10/105 705/320 |
| 2011/0106610 A1* | 5/2011 | Landis | G06Q 30/02 705/14.66 |
| 2011/0270926 A1* | 11/2011 | Boyd | H04L 51/52 709/204 |
| 2012/0023030 A1* | 1/2012 | Jeffries | G06Q 10/1053 705/319 |
| 2014/0058954 A1* | 2/2014 | Perlstein | G06Q 50/188 705/80 |
| 2014/0129463 A1* | 5/2014 | Grayevsky | G06Q 10/1053 705/321 |
| 2016/0132231 A1* | 5/2016 | Rathod | G06F 3/16 715/727 |
| 2016/0253627 A1* | 9/2016 | Dawood | G06Q 10/063112 705/321 |
| 2019/0139000 A1* | 5/2019 | Sharpe | G06Q 10/1091 |
| 2020/0184564 A1* | 6/2020 | Lim | G06Q 40/04 |
| 2021/0357707 A1* | 11/2021 | Bondugula | G06N 20/20 |

* cited by examiner

*Primary Examiner* — Harris C Wang
(74) *Attorney, Agent, or Firm* — Perkins Coie LLP; Michael Glenn

(57) ABSTRACT

In accordance with various embodiments and aspects of the invention, a system and method are disclosed that provides a tool for retrieving and authentication of users' information as related to profile, project, and experiences.

20 Claims, 21 Drawing Sheets verification process of the system

An Overview of the system's functionality

SYSTEM AGGREGATOR AND PROJECT ROLE VERIFICATION SYSTEM

CROSS-REFERENCE TO RELATED APPLICATION

This application claims the benefit of priority of U.S. provisional application No. 63/312,009, filed Feb. 19, 2022, the contents of which are herein incorporated by reference.

FIELD OF THE INVENTION

The present technology is in the field of computer network systems and, more specifically, related to system aggregators and information integrity and verification tools.

BACKGROUND

With the advent of the Internet came a plethora of and prevalent use of Internet applications for personal and business use. The Internet has been a major factor in the dissemination of information and has been a major contributor to improvements in information technology. However, the Internet has become a vast source of disparate, consumer information concentrated in the hands of a few technically elite companies. This information is considered a commodity and as valuable as gold to these companies. As a result, there exists an unfilled gap in information technology with respect to tools available to manage this information at holistic levels for the purpose of serving certain consumer business and personal needs.

BRIEF DESCRIPTION OF THE DRAWINGS

In order to more fully understand the invention, reference is made to the accompanying drawings. The invention is described in accordance with the aspects and embodiments in the following description with reference to the drawings or figures (FIG.), in which like numbers represent the same or similar elements. Understanding that these drawings are not to be considered limitations in the scope of the invention, the presently described aspects and embodiments and the presently understood best mode of the invention are described with additional detail through use of the accompanying drawings.

DETAILED DESCRIPTION

Figure 1:
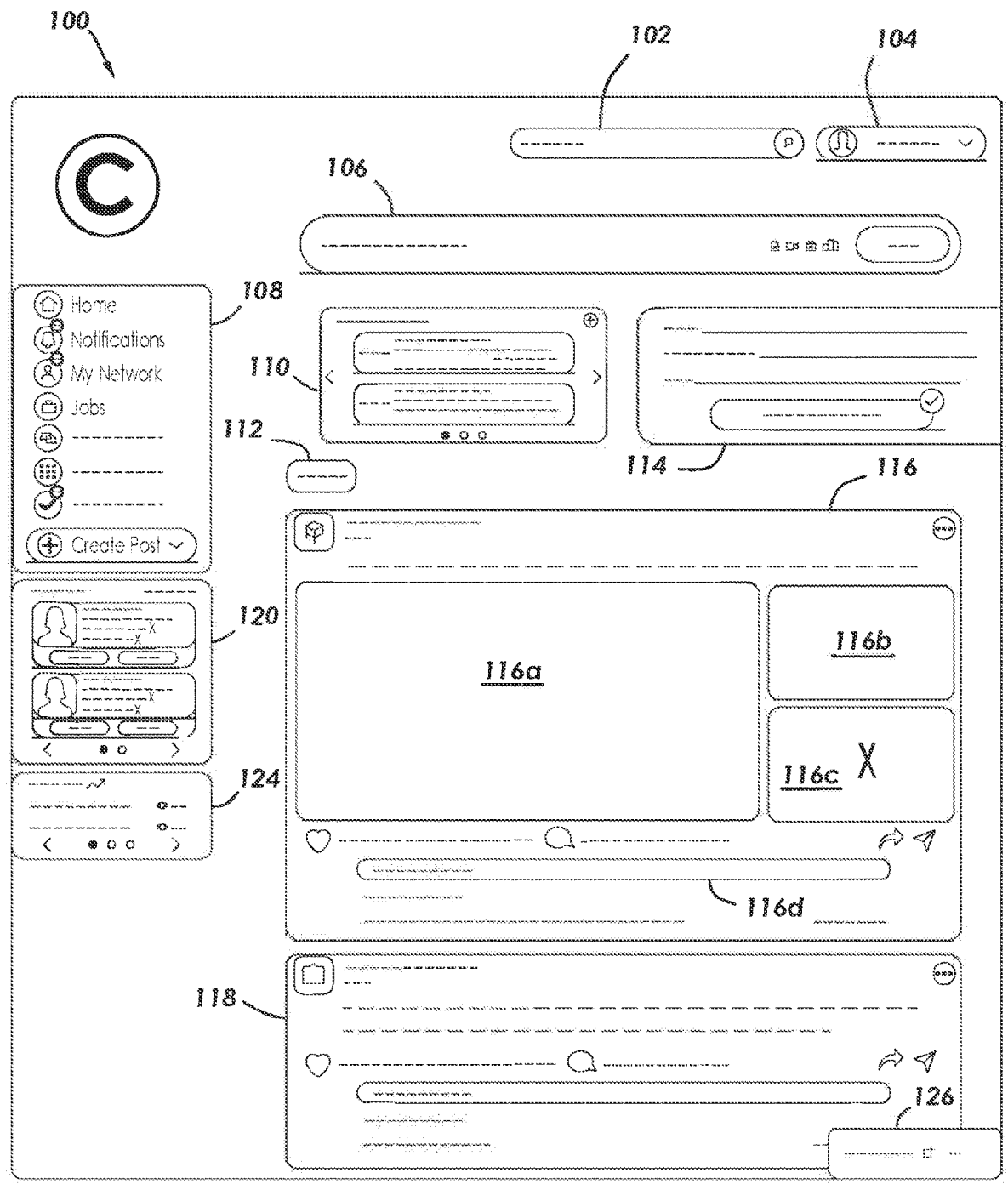
FIG. 1 shows a screen shot of a graphical user interface of a system of the invention in accordance with the various aspects and embodiments of the invention.

The following describes various examples of the present technology that illustrate various aspects and embodiments of the invention. Generally, examples can use the described aspects in any combination. All statements herein reciting principles, aspects, and embodiments as well as specific examples thereof, are intended to encompass both structural and functional equivalents thereof. Additionally, it is intended that such equivalents include both currently known equivalents and equivalents developed in the future, i.e., any elements developed that perform the same function, regardless of structure.

As previously discussed, Internet (including intranet) based information is stored in huge, disparate data storage systems of various company networks. These systems are complex systems that use standardized, opensource, and proprietary interface protocols and require complex tools and expert skills to access and use information stored therein in a constructive manner.

The information stored therein can be accessible to consumers through system and user interfaces developed by companies with the skill and resources able to build this type of technology. These types of system and user interfaces are designed and configured to provide a service or services to consumers that are beneficial to a company's business model. Unfortunately, the existing business models do not serve the consumer at a holistic level for personal and business gain.

There are some tools available that allow business entities to identify individuals, e.g., by harvesting information from designated data repositories or by crawling the web. Typically, these tools are used to identify people for potential sales calls or to collect on a debt.

These types of tools, however, are very limited in their function and use. More specifically, these tools lack the functionality to aggregate information from various sources each with distinct interface capabilities, integrate with and use information available from social networking systems, determine employment functions (job or project roles), verify information, assess information accuracy, or maintain the integrity of information communicated and stored during the process of collecting this information.

Presented herein is a system and method for obtaining consumer profile information from a multitude of sources, authenticating consumer information as related to a consumer's work, personal, business, or any combination thereof, related profile information based on a defined role, e.g., a functional role that requires a specific skill set, experience, credentials, security clearance, etc., and select consumer provided parameters.

As an example of a use case, an applicant submits a job application for a prestigious role with a biopharmaceutical company. Using sets of defined profile verification parameters and various defined system interface constructs, the system and method can parse the job application, select an appropriate set of profile verification parameters and system interface constructs, retrieve the necessary information, and verify and disparities between the information collected, and the user provided information.

Profile verification parameters are parameters set by the company, such as: applicant name, date, birth, school attended, degree obtained, grade point average (GPA) or averages, published articles, issued patents and published applications, and various information sources associated with publications. These are parameters the system presented herein can use to verify information provided by the applicant.

The system interface constructs are various variables, software logic, or both that can be used to access services of a remote system. The information retrieved can be used to verify a profile for a job. The constructs can include variables and system calls for, as an example, a particular university or college, e.g., at a department level, patent and trademark office (PTO), various repositories for scientific literature, such as the National Center for Biotechnology Information (NCBI™), and social networking applications, such as Facebook®, Twitter®, and LinkedIn®.

Herein, the term consumer and user are interchangeable and depending on the application may be considered an individual entity or a business entity.

Referring now to FIG. 1 through FIG. 12, collectively and specifically to FIG. 1, a screen representation of a graphical user interface 100 is shown in accordance with various aspects and embodiments of the invention. The graphical user interface 100 displays a system's home page, with 102 through 126 fields. Field 102 shows a search field of the system wherein a user can type in and search for specific people, companies, and job titles in user's network.

Field 104 shows the user profile of the system wherein the user profile includes but is not limited to an activity log option that allows the user to view a timeline of the user system actions, a setting option wherein the user can adjust the different settings of the system, for example, privacy settings, and then a logout option to sign out from the system.

Field 106 shows a posting service of the system wherein the user can create a post and has the option to include embeddable content such as images and videos from different platforms such as Spotify, Instagram, TikTok, YouTube, Vimeo, and Twitter. The post appears on the user's page 202*l*, 202*o*, and it can be visible for the user's network based on the user's privacy settings.

Field 108 shows a side menu of the system. The side menu includes the hope page, notifications, network web, job listings, messaging, verified projects, verified requests, and the posting service Field 106 of the system.

Field 110 shows an industry news portion of the system wherein, based on what the user industry field is, taking from the user's profile, shows the news regarding that industry. For example, if the user's profile shows that the user is in the music industry, the system displays the music-related news.

Field 112 shows the title of the newsfeed section 116. The newsfeed section 116 shows 60% of the user's connections' content 116*a*, 116*b*, 116*c*. Users can write comments in field 116*d* on the user or user's connections' posts. Users can view others' comments on the user or user's connections' posts. The newsfeed section 116 of the system shows 20% industry news relevant to the user's industry/industries in field 118. The newsfeed section 116 of the system shows 20% content of the user's connections' connections that are relevant to the user and have been gaining traction to encourage the user to expand the user's network. Connections of the user's connections' content can be deemed relevant based on overlapping data such as mutually worked roles, locations, industries, genres/sub-categories.

Field 114 shows an input screen of the system wherein the user provides the user's alleged role information on a particular project for the system to verify. The user can request to verify working roles on the project via link submission of the user's public record platform to the system. For example, the user can submit the user's Instagram posts, TikTok, IMDb, AllMusic integration/data import, YouTube, news articles, and the like in which the user had a specific role in that project. Once verified the user's role in that specific project, the system generates a label for the verified role project. Then the system displays the label on the user's profile, on a user company's verified list page, underneath a list of all the people who have been verified for working the related project and listed on a project page. The label includes a project title, the user's role on that project, and at least one public record verification source. For example, the label asserted "verified by *Person Name*" or "verified by *New York Times*" or "verified by *Instagram post*." For example: if a user is tagged as a hairstylist on Instagram, the user can log in with the user's Instagram account through the system to claim ownership over that account associated with the credit marked in the caption or comment thread. Then the user can be verified for the hairstylist role by the system. If the user submits an external link such as a web article for verification, the user's name is listed in relation to the user's alleged role in order to receive verification.

Field 120 shows the people who requested the user for the connection includes the information of the people who requested the user for the connection. The information includes but is not limited to the people requester's roles/profession/credentials, their specific industry, their mutual connections with the user, and the number of verified projects through the system. Field 120 shows the accept button for the user to accept the Expand request of the people requester and the ignore button to bypass the Expand request of the people requester. Field 124 shows a trending section of the system wherein the system displays the most popular latest topics.

Figure 2:
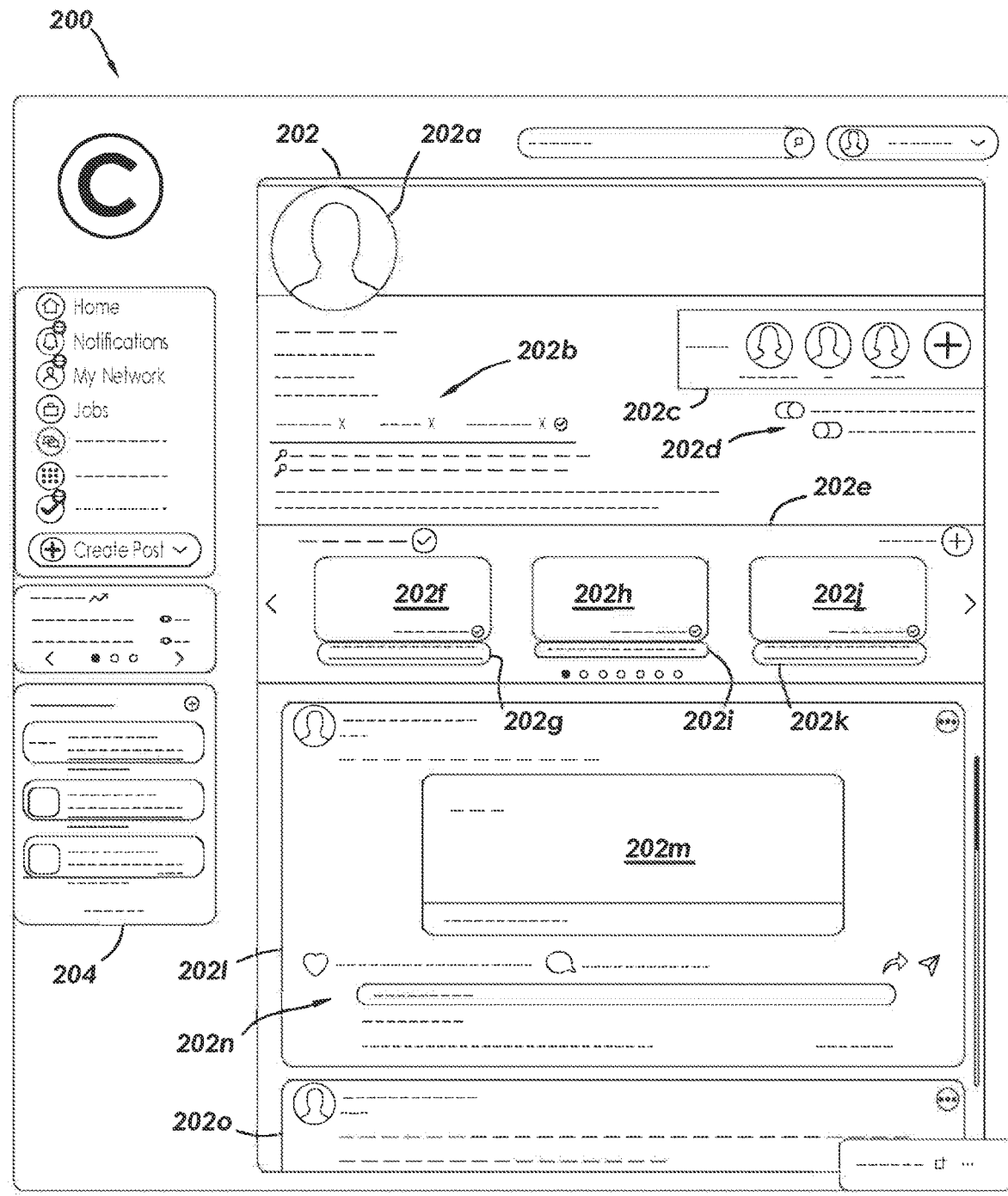
FIG. 2 shows a screen shot of a graphical user interface of a system of the invention in accordance with the various aspects and embodiments of the invention.

Referring now to FIG. 2, a screen shot representation of a graphical user interface 200 is shown in accordance with various aspects and embodiments of the invention. The graphical user interface 200 displays the user's profile page overview and its specific features. Field 202 shows a view of user's profile. Field 202a shows the user's profile picture. Field 202b shows the amount of users' connections, followers, and verified projects and accolades. Field 202c shows a view of the user's highlighted content and verifications. Field 202d shows the user-controlled toggles to mark themselves available for last minute work vs not as well as open to unpaid collaboration vs not. Field 202e shows a display of verified projects and accolades. The dots underneath Field 202e shows the pages of verified projects and accolades. Fields 202f, 202h, and 202j shows the user's verified projects and accolades.

Each field of 202f, 202h, and 202j indicates that each 202f, 202h, and 202j represent projects or accolades that is verified along with the public record verification source. The checkmark beneath each Field of 202f, 202h, and 202j indicates that each 202f, 202h, and 202j project or accolade is verified along with the public record verification source. Field 202g, 202i, and 202k wherein each 202g, 202i, and 202k shows a label that includes a verified project title, and the user's verified role in the verified project. Field 202l and 202o shows the user's different posts in the system. Field 202n shows that the system can receive the user's written input on user's posts. User can write comments 116d on the user's posts and view others' comments on the user's posts. Field 202m shows that the system can receive and display a pre-saved link to the content. Field 204 that is like Field 110 shows the industry news portion of the system wherein, based on what the user industry field is, taking from the user's profile, shows the news regarding that industry. For example, if the user's profile shows that the user is in the fashion industry, the system displays the fashion-related news.

Figure 3:
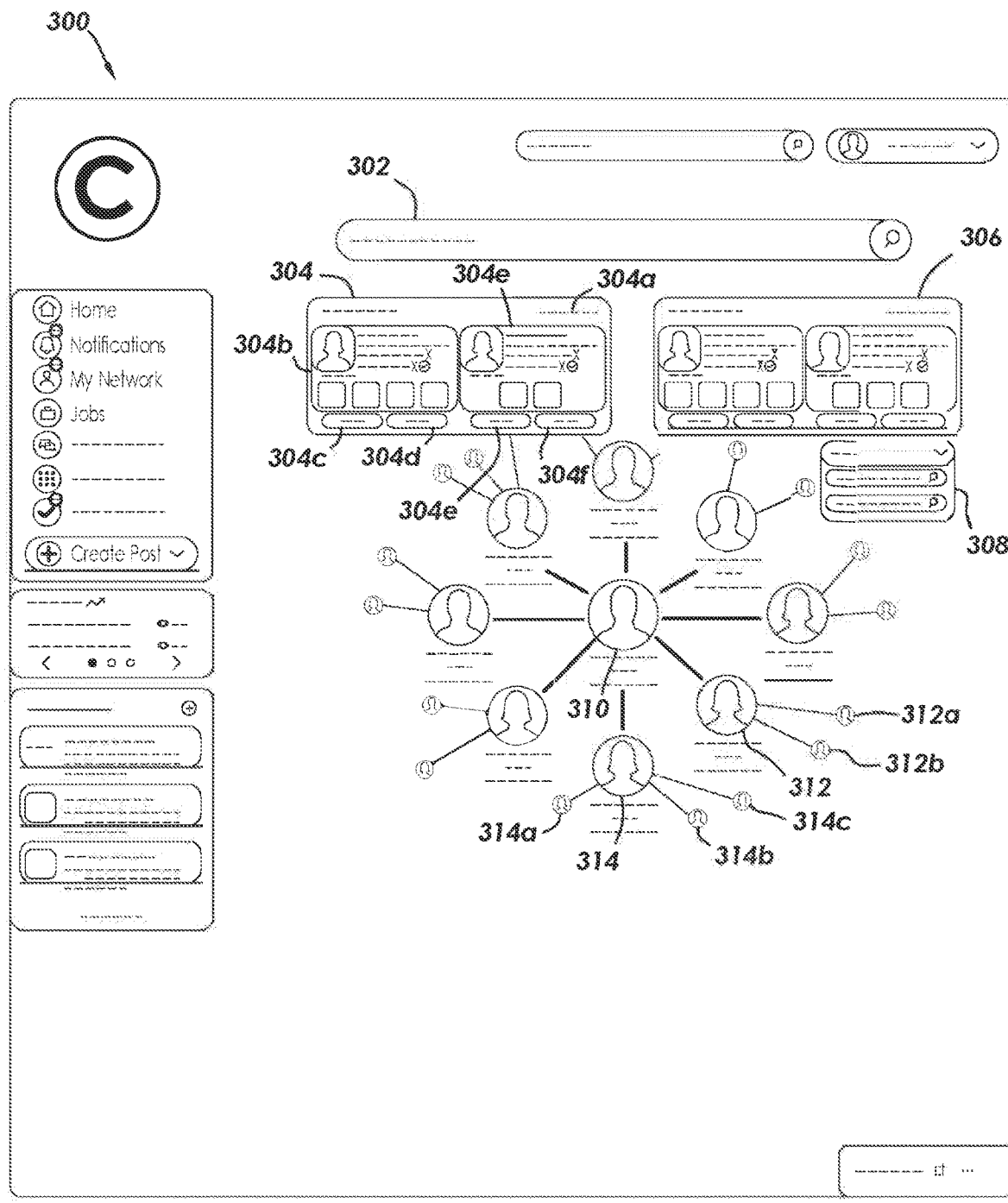
FIG. 3 shows a screen shot of a graphical user interface of a system of the invention in accordance with the various aspects and embodiments of the invention.
Figure 5:
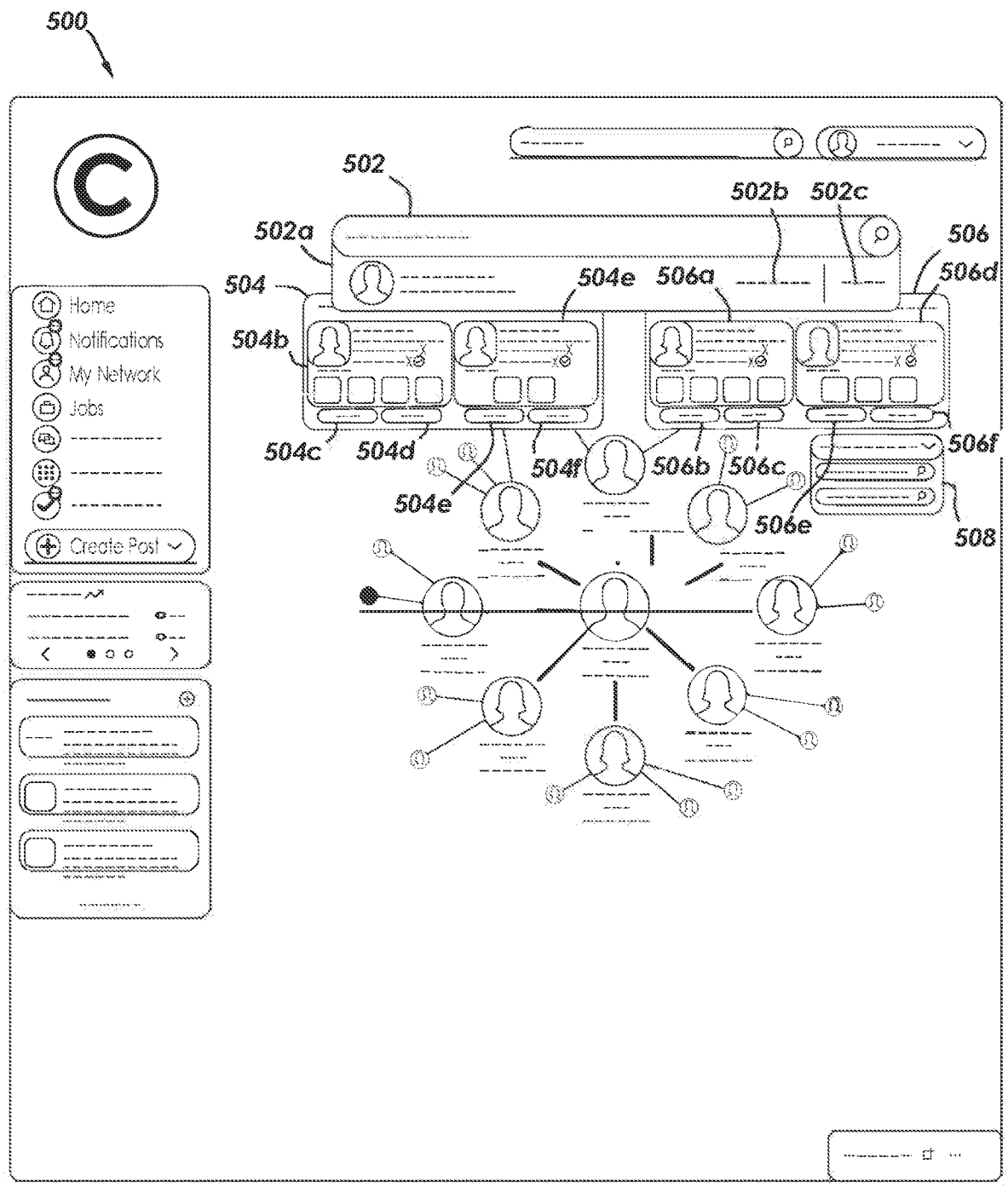
FIG. 5 shows a screen shot of a graphical user interface of a system of the invention in accordance with the various aspects and embodiments of the invention.

Referring now to FIG. 3 and FIG. 5, a screen shot representation of a graphical user interface 300 and user interface 500, respectively, is shown in accordance with various aspects and embodiments of the invention. The graphical user interface 300 displays the network web of the system. Field 302 shows the user's network search of the system wherein the user can search for specific people 502a, companies, and job titles in the user's network. The user's network search 302 also has other functionalities, including showing the user's network's network by typing the specific people 502a and clicking the Expand button 502c of the system. The user then can see people within that specific people's 502a network who are valuable to the user, who are not yet in the user's network. When the user hovers over them, the user can see the people's preview information, including people's highlights in list format and the addition of a + sign to add the people as a connection. The user can search for other users based on users' verified projects. Users can mark themselves as available for last-minute work Field 202d. In that case, if a selected project requires a specific role at the last minute, the corroborated user can search that role that needs to be filled and check off that the corroborated user is looking for users available for last-minute work. Search can also narrow down based on location, number of verified projects, number of times a particular user has worked the searched role.

Field 304 shows a Expand request portion of the system. Field 304b and 304e show the people who requested the user for the connection. Fields 304b and 304e each includes the information of the people who requested the user for the connection. The information includes but is not limited to the people requester's roles, profession, credentials, their specific industry, the mutual connections they have with the user, the number of their verified projects through the system, and their pinned profile highlights like a profile preview. Fields 304c and 304e show the accept button for the user to accept the Expand request of the people requester. Fields 304d and 304f show the ignore button for the user to bypass the Expand request of the people requester. Field 306 shows the people that the system suggested to the user for connection based on their shared interests, mutual relationships, etc.

In accordance with one or more aspects and embodiments of the invention, if the user wants to connect with a particular person on the suggested list, the user can push the connect button (506b, 506e) to accept the people requester. If the user does not want to connect with a particular person on the suggested list, the user can push the ignore button (506c, 506f) to bypass the people requester. Then the system finds someone else as a suggested connection. All Expand requests populate in a user's notifications in addition to a section of the user's inbox called Expand. If users do not want to use this function at all, user can mute it. The purpose of having a separate section for Expand messages is that the user's inbox does not clog up with requests and get in the way of user conversations. Once a connection is accepted, the request moves out of Expand and into the regular inbox.

Field 308 shows the top closest connections to the user based on the user's top connections that the user most interacts with 308a. The user can change based upon whether the user filter through a specific city 308b and/or industry 308c and/or genre and/or roles worked. Fields 310, 312, and 314 show the visual portion of the user's network page wherein the middle bubble/profile 310 being the user's profile picture 310 and automatically other bubbles/profiles 312, 314, and the like that populate around the user's profile picture 310 are the people the user interacts with the most within the system based on the number of messages exchanged, the amount of times likes on posts have been exchanged, the amount of times comments on posts have been exchanged. The way that the system tracks these interactions is mutual interaction between the user and the people or just the user interacts with the people.

Figure 4:
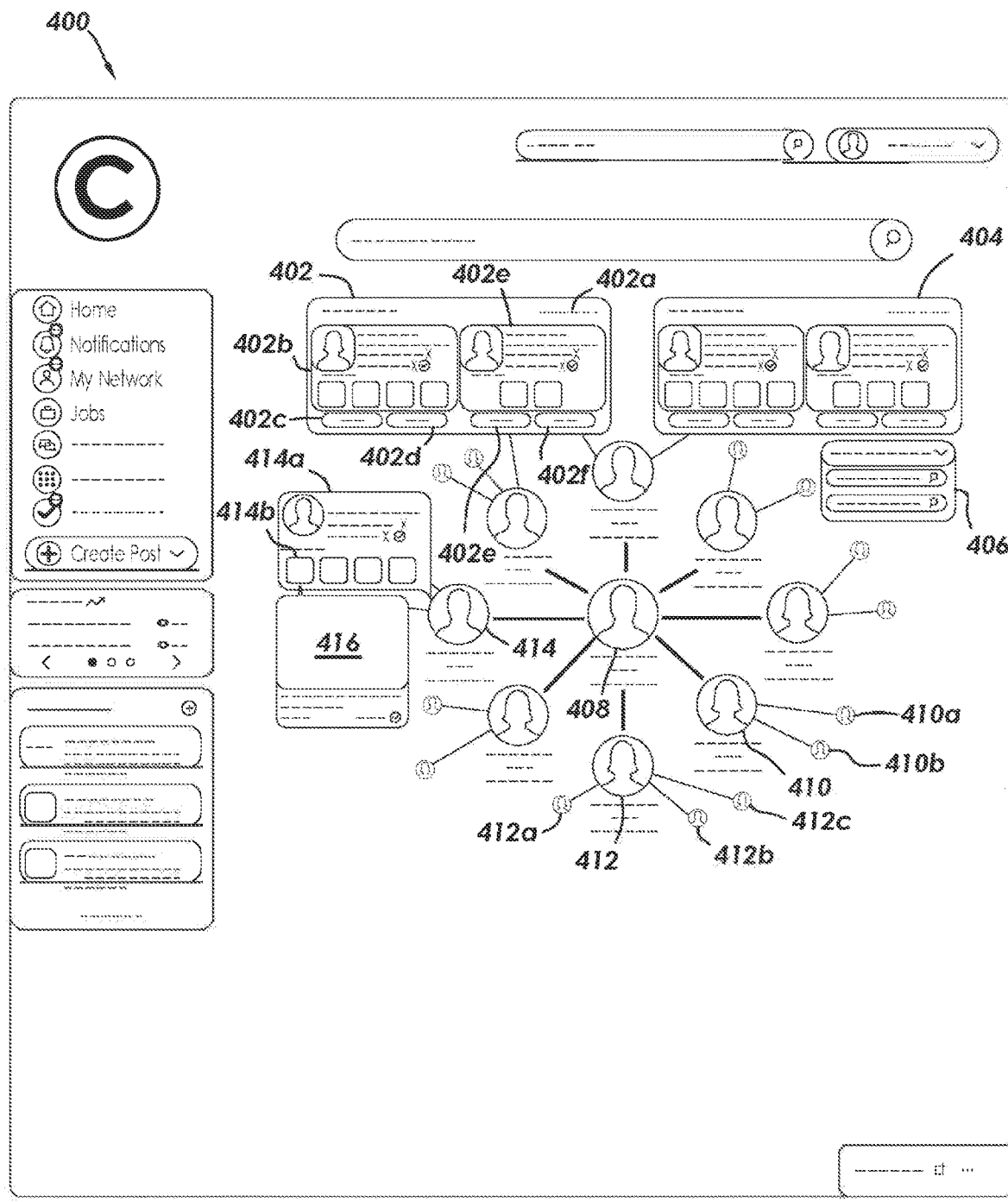
FIG. 4 shows a screen shot of a graphical user interface of a system of the invention in accordance with the various aspects and embodiments of the invention.

Referring in addition to FIG. 4, the user can hover over bubbles/profiles 312, 314 and the like to reveal the people account's name 414a, city 414a, profession/industry 414a, and see their top pinned profile highlights 414b and 416, like a profile preview. When the user clicks one of these profiles (312 or 314) and the like, the profiles become the center bubble/profile, and the other people around them 312a, 312b, 314a, 314b, and 314c become people within the network of profile 312 or 314, respectively, who would be valuable to the user and are not yet in user's network. When the user hovers over them, the user can see the same information and the addition of a "+" sign can add them as a connection. The user can go down the line and make that person the center and see who in their network is most valuable to the user and continue this process in as many directions as the user would like, for as long as the user would like. The surrounding bubbles/profiles 312 and 314, and the like, can change based upon whether the user filters through a specific city 308b and/or industry 308c and/or genre and/or roles worked; the initial default that comes up on the page can be user's top connections that the user most interacts with.

Figure 6:
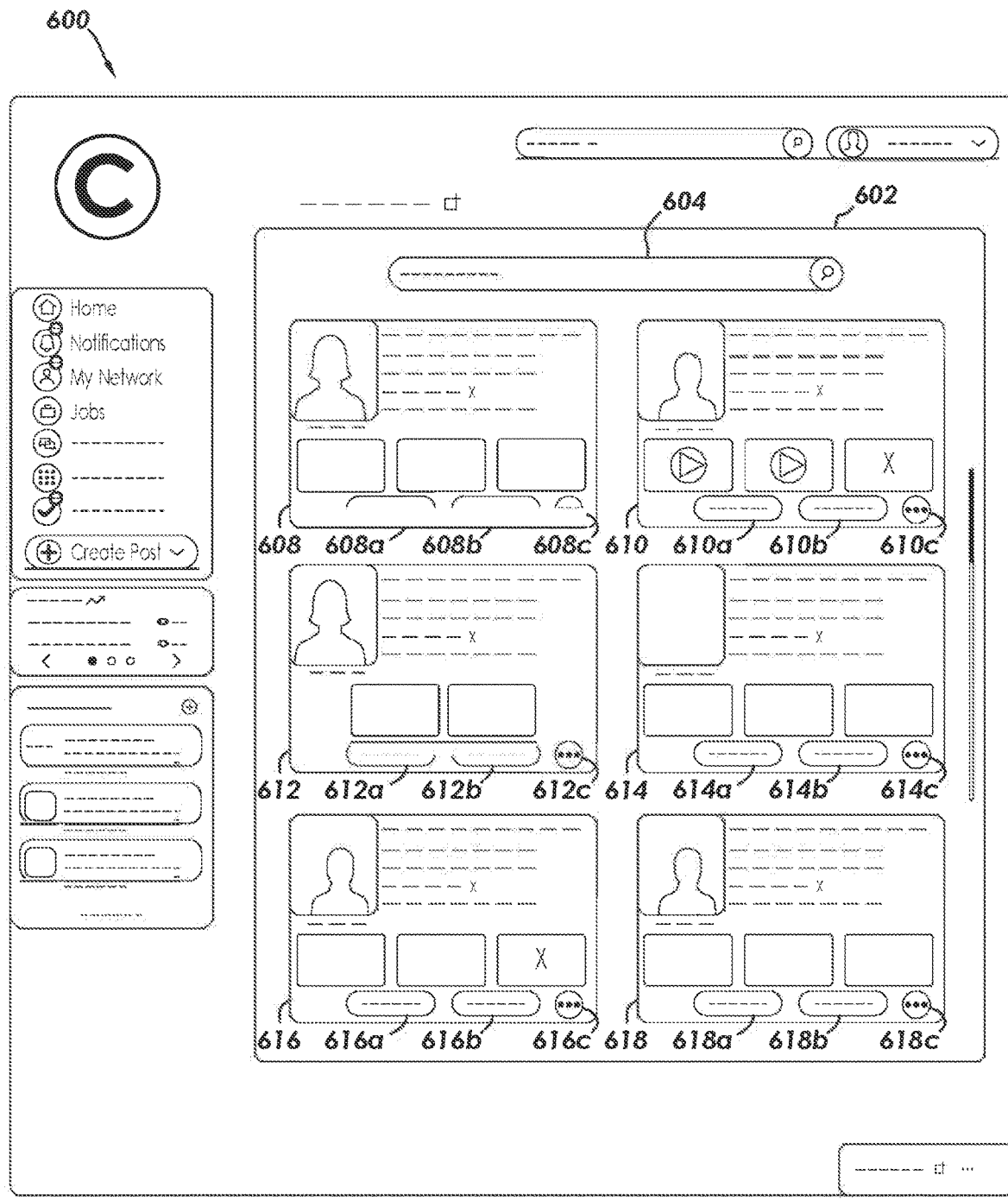
FIG. 6 shows a screen shot of a graphical user interface of a system of the invention in accordance with the various aspects and embodiments of the invention.

Referring now to FIG. 6, a screen shot representation of a graphical user interface 600 is shown in accordance with various aspects and embodiments of the invention. Field 602 shows the user's projects section that the user is working on. For this example, the system has not verified the projects. Field 604 shows the search field for searching all projects that the user is working on. Fields 608, 610, 612, 614, 616, and 618 show the different user's projects that the user is working on, and the system has not verified the projects. The user has the options to open project 608a, 610a, 612a, 614a, 616a, 618a and/or invite collaborators 608b, 610b, 612b, 614b, 616b, 618b. Fields 608c, 610c, 612c, 614c, 616c, 618c shows a button to toggle a menu to view options such as share, view, hide, and others.

Figure 7:
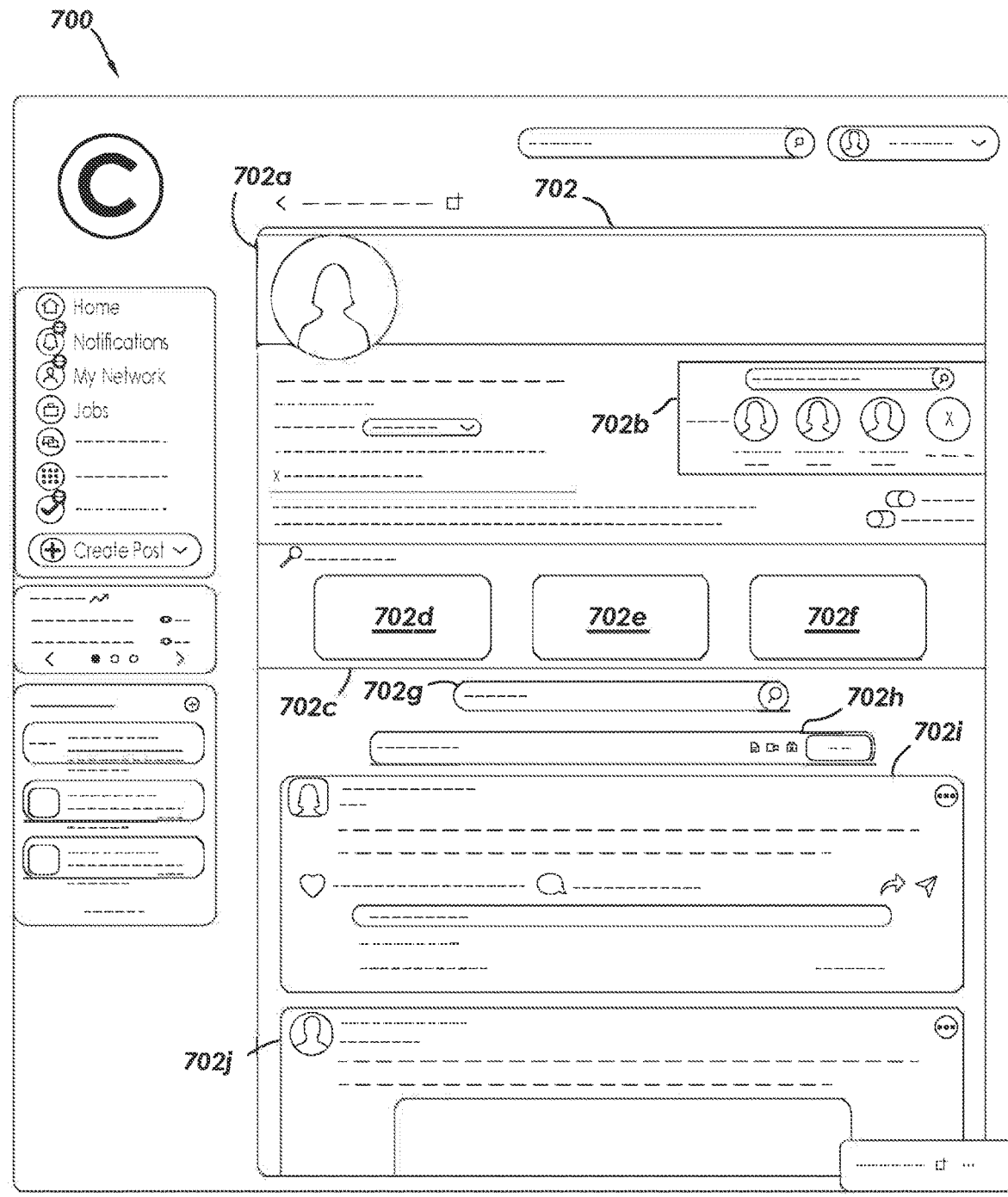
FIG. 7 shows a screen shot of a graphical user interface of a system of the invention in accordance with the various aspects and embodiments of the invention.

Referring now to FIG. 7, a screen shot representation of a graphical user interface 700 is shown in accordance with various aspects and embodiments of the invention. Field 702 shows an overview of the selected project from the user's projects section 602. One or more corroborated user(s) as host(s) of the new project can select an industry-specific project from a system pre-defined industry-specific project from a dropdown menu 702a and add collaborators to the corroborated user's selected project. The dropdown menu populates to show projects in which the corroborated user has been approved for work based on the corroborated user's previous verified roles on other projects, in other words, previously verified projects. The corroborated user(s) can get suggestions on the types of roles 802d (FIG. 8) needed to make the project happen. Field 802d shows the roles deemed valuable for the user's industry-specific selected project.

Field 702b shows the list of the collaborators who are already on the corroborated users' selected project. Field 702c shows verified list display banner; a holding group for a slideshow of verified projects or accolades. Fields 702d, 702e, 702f show verified projects or accolades display image OR embedded content along with a description of that verified item's role and project title or accolade title and award committee as well as year associated. Field 702g shows search bar to search that user's posts. Field 702h shows feed post creation area on user's page. Only visible when the current user is the page user. Field 702i shows a feed post. Field 702j shows a feed post.

Figure 8:
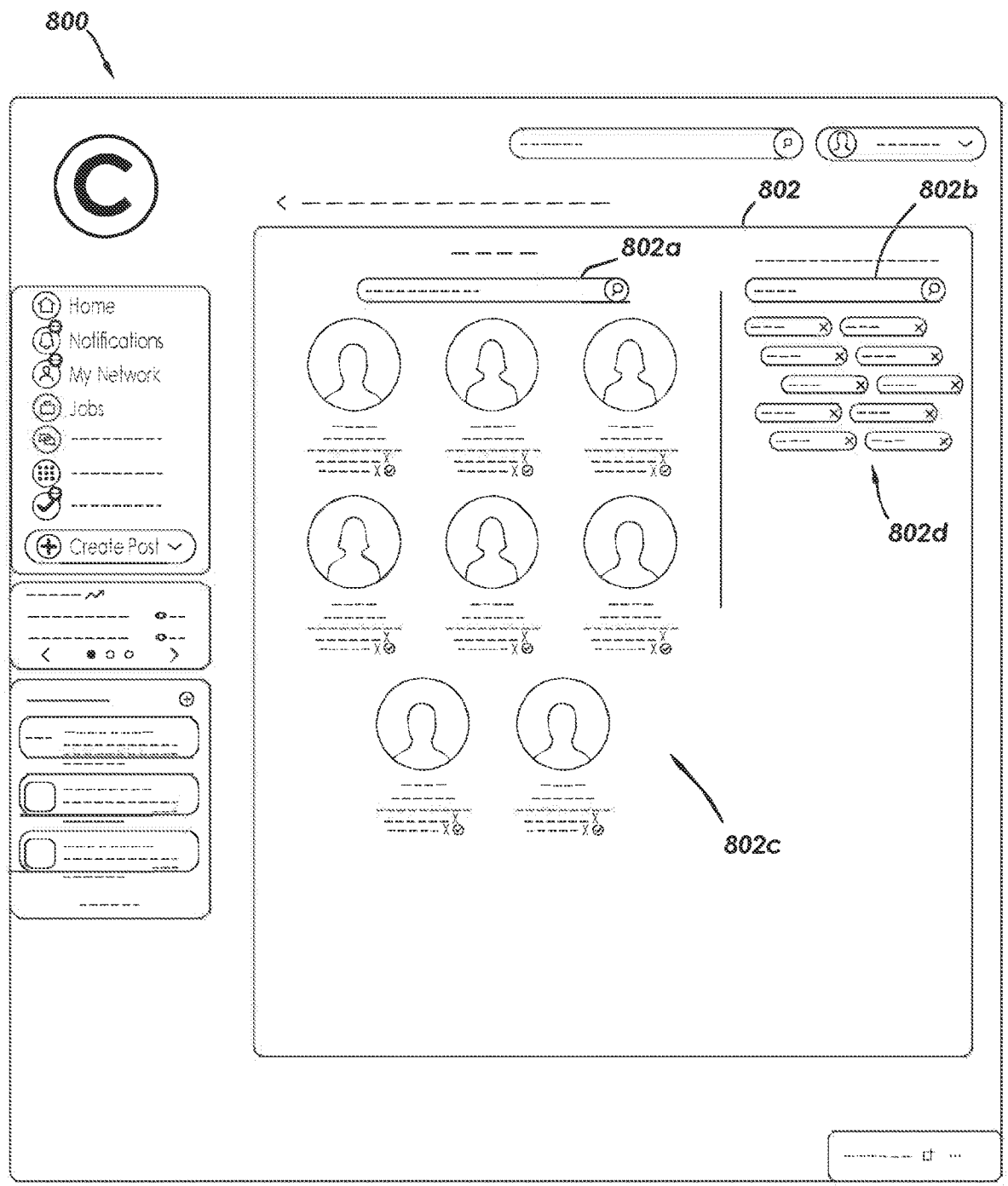
FIG. 8 shows a screen shot of a graphical user interface of a system of the invention in accordance with the various aspects and embodiments of the invention.
Figure 9:
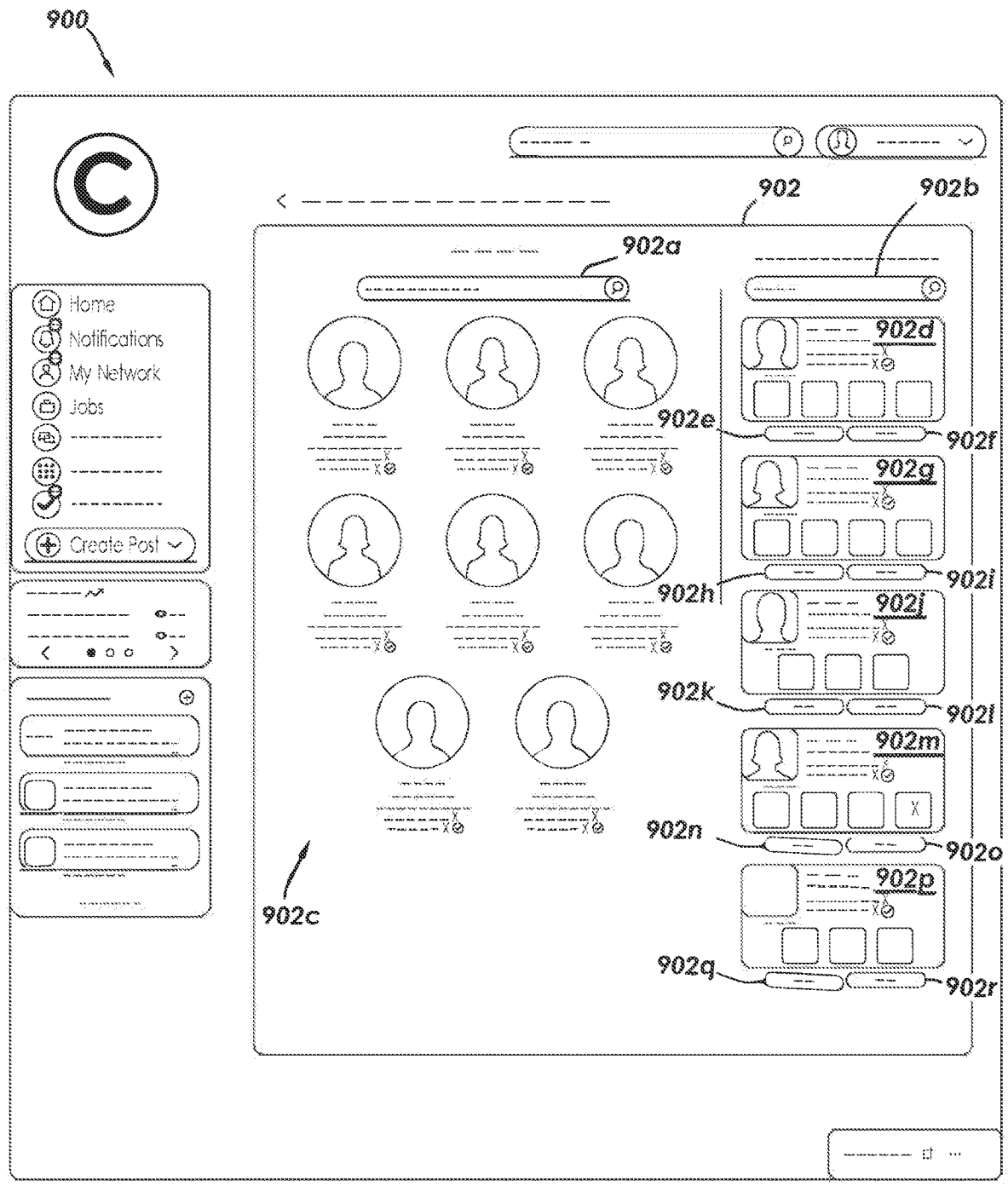
FIG. 9 shows a screen shot of a graphical user interface of a system of the invention in accordance with the various aspects and embodiments of the invention.

Referring now to FIG. 8 and FIG. 9, field 802 shows the overview of the collaborators who are already on the corroborated users' selected project on the left hand of the screen representation in accordance with various aspects and embodiments of the invention. On the right hand of the screen representation, the roles deemed valuable for the corroborated user's industry-specific selected project that needed to make the project happen are shown in accordance with various aspects and embodiments of the invention. In accordance with one aspect and embodiment of the invention, the corroborated user(s) can add the corroborated users' friends to collaborate on the selected project 702 and fill in the gaps on unfilled roles based on the project's needs. In accordance with one aspect and embodiment of the invention, a list of suggested roles 802d can appear and once the corroborated user clicks it, a list of potential collaborators suggested by the system 902d, 902g, 902j, 902m, 902p can appear based on their relevance to the suggested role 802d clicked, and they can be prioritized based on potential collaborator's number of mutual connections to the corroborated user(s) and potential collaborators number of times they have worked the particular role selected which needs to be filled. The corroborated user(s) then can invite 902e, 902h, 902k, 902n, 902q, the potential collaborates to become collaborators on the selected project. The corroborated user(s) can skip 902f, 902i, 902l, 902o, 902r the potential collaborators.

In accordance with one aspect and embodiment of the invention, if the corroborated user(s) need(s) to fill a role that is not one of the option titles which automatically populates as a suggested role required for the selected project, the corroborated user(s) can type the required role into the search bar 802b and find the collaborators based on the project's needs. Field 902 shows an overview of the list of the collaborators who are already on the users' selected project 802c, 902c, 702b on the left hand of the screen representation. The right hand of the screen representation shows a list of potential collaborators suggested by the system. The user can search people based on people's roles or people's names 802a, 902a and see how many times people were verified for their roles through the system 802c, 902c. Field 802c, 902c are the expansion of Field 702b wherein the list of the collaborators who are already on the users' selected project in accordance with various aspects and embodiments of the invention.

The corroborated user(s) then become(s) the admin of the corroborated users' selected project and can verify the collaborators who were working on the corroborated users' project. The system authorizes the corroborated user admin(s) to verify collaborators worked on the corroborated users' project after first determining whether the selected project has been completed, who was on the selected project, and determines the project's admin(s). After these steps, the system authorizes the corroborated user admin(s) to verify the users' collaborators on the selected project. Field 902d, 902g, 902j, 902m, 902p show the relevant collaborators or services the user(s) searched 802b, 902b based on their specific verified roles or service capacity to work on the users' selected project.

Figure 10:
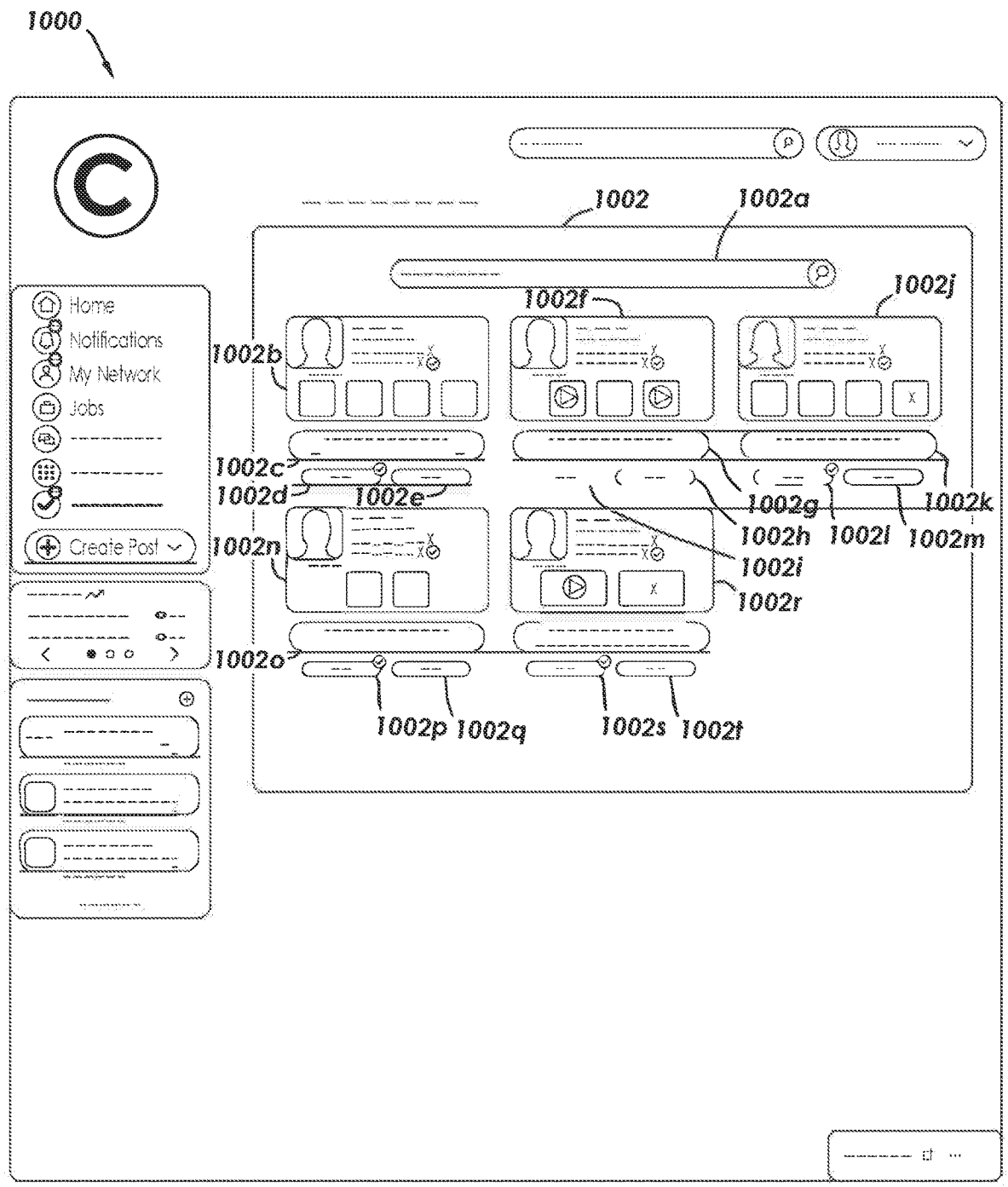
FIG. 10 shows a screen shot of a graphical user interface of a system of the invention in accordance with the various aspects and embodiments of the invention.

Referring now to FIG. 10, a screen shot representation of a graphical user interface 1000 is shown in accordance with various aspects and embodiments of the invention. The graphical user interface 1000 displays the verification requests of the system. Field 1002 shows the overview page of the verification requests to the user admin of the selected now completed project from the collaborators in that project. Field 1002a shows a search bar for searching all verification requests from collaborators on the selected now completed project. Fields 1002b, 1002f, 1002j, 1002n, 1002r show the profile information of the collaborator in the project, including role, the number of mutual connections with the user, the number of verified projects, and highlights of the collaborator. Fields 1002c, 1002g, 1002k, 1002o show the label wherein the label includes a name of the collaborator, collaborator's role in the selected project, the title of the selected project and a request for role verification. Fields 1002d, 1002i, 1002l, 1002p, 1002s show the verify button for the user admin to accept the verification request of the collaborator requester. Fields 1002e, 1002h, 1002m, 1002q and 1002t show the skip button for the user admin to bypass the verification request of the collaborator requester.

In accordance with one aspect and embodiment of the invention, a peer/collaborator verification process is a process wherein the system authorizes the corroborated user to verify other peers/collaborators on the corroborated user's selected project. The project in the peer verification is the selected project from a system pre-defined industry-specific projects that the corroborated user was selected and initiated inside the system, and now it is completed and has the public record verification link available. The system authenticates the validity of the information received from the corroborated user regarding other peers/collaborators with respect to the verified project. The system determines if a peer working role and profession is associated with the verified project in accordance with various aspects and embodiments of the invention.

In accordance with one aspect and embodiment of the invention, the system receives a verification request from a peer/collaborator to send to the corroborated user for working on the corroborated user's verified project. The system sends a notification to the corroborated user stating that the peer/collaborator has requested verification. Then the system receives the corroborated user's response approving or denying the peer's requested verification. For example, the peer/collaborator types in corroborated user's full name, the dropdown below then populates to show projects which corroborated user has been approved for working. The peer/collaborator writes in the peer/collaborator alleged role. The peer/collaborator has the option to add a supporting link for this verification. The peer/collaborator submits the verification request. The corroborated user gets a notification stating the peer/collaborator has requested verification, at which point the corroborated user can approve or deny. If approved, the project is sent to the back-end moderation verifying team to give final approval.

The system, once verified the peer/collaborator's role in the selected project, generates a label for the verified role project and display the verified role on the peer/collaborator's profile, on the peer/collaborator company's verified list page, underneath a list of all the people who have been verified for working the related project and listed on a project page. The label includes a project title, the peer/collaborator's role on that project, and at least one public record verification source. For example, the label asserted "the peer/collaborator's role on the project "verified by *the corroborated user's name*" for the "*project's name*."

In accordance with one aspect and embodiment of the invention the corroborated user can also grant the peer/collaborator verification on a selected project without peer/collaborator's request. For example, the corroborated user writes in peer/collaborator's full name. Then the dropdown below is populated only with verified projects the corroborated user has worked; the corroborated user selects the project for which the corroborated user has been approved that the corroborated user would like to grant peer/collaborator credit for working. The corroborated user has the option to write in the peer/collaborator's role on the selected now completed project. The corroborated user has the option to provide a supporting link on the peer/collaborator's behalf. The corroborated user has the ability to assign a display image and embeddable content regarding the peer/collaborator participating in the selected project. Peer/collaborator gets a notification stating that the corroborated user has granted the peer/collaborator verification. This information is then sent to the system's moderation verifying team on the backend. The system, once verified the peer/collaborator's role in the selected project, generates a label for the verified role project and display the verified role on the peer/collaborator's profile, on the peer/collaborator company's verified list page, underneath a list of all the people who have been verified for working the related project and listed on a project page. The label includes a project title, the peer/collaborator's role on that project, and at least one public record verification source. For example, the label asserted "the peer/collaborator's role on the project "verified by *the corroborated user's name*" for the "*project's name*."

According to one or more aspects and embodiments of the invention, if the collaborator provides at least one public record verification source for the collaborator's alleged role on the selected project, and the system verifies the collaborator's alleged role on the selected project, the collaborator can then verify other peers/collaborators for the selected project. Suppose the collaborator does not provide the supporting link for the collaborator's alleged role. In that case, the collaborator can only request verification of the collaborator's role on the selected project but cannot verify other collaborators on the same project.

Figure 11:
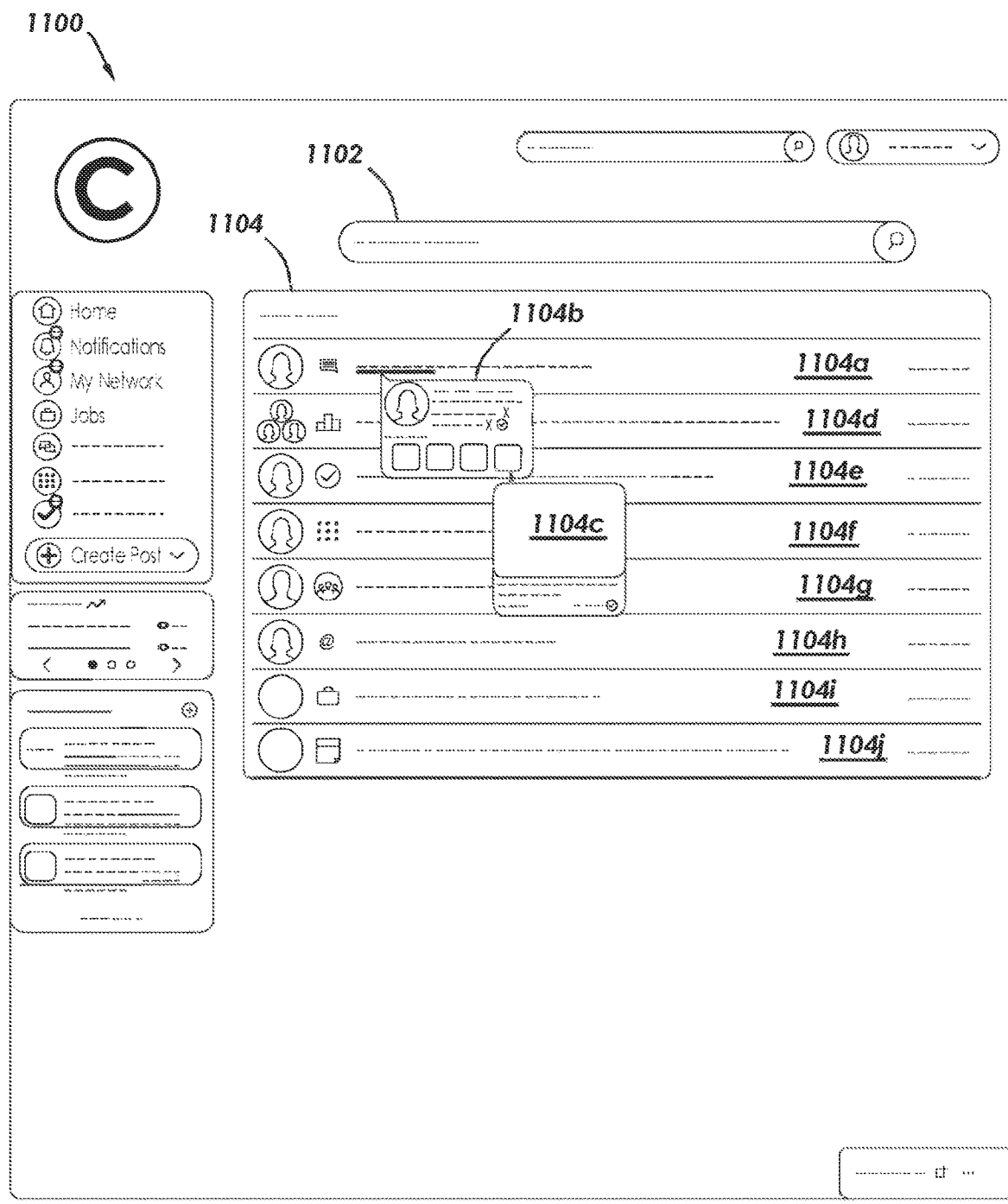
FIG. 11 shows a screen shot of a graphical user interface of a system of the invention in accordance with the various aspects and embodiments of the invention.

Referring now to FIG. 11, a screen shot representation of a graphical user interface 1100 is shown in accordance with various aspects and embodiments of the invention. The graphical user interface 1100 displays the notification section of the system. Field 1102 shows the search field for searching user's notifications. Field 1104 shows the preview window of the user's notifications 1104a, 1104d, 1104e, 1104f, 1104g, 1104h, 1104i, and 1104j. When the user hovers over people's names, the user can see the people preview information 1104b, including the people account's name 414a, city 414a, profession/industry 414a, and people's top pinned profile highlights 414b, 416. If the user hovers over the highlight, the system can display the content of the highlight 1104c.

Figure 12:
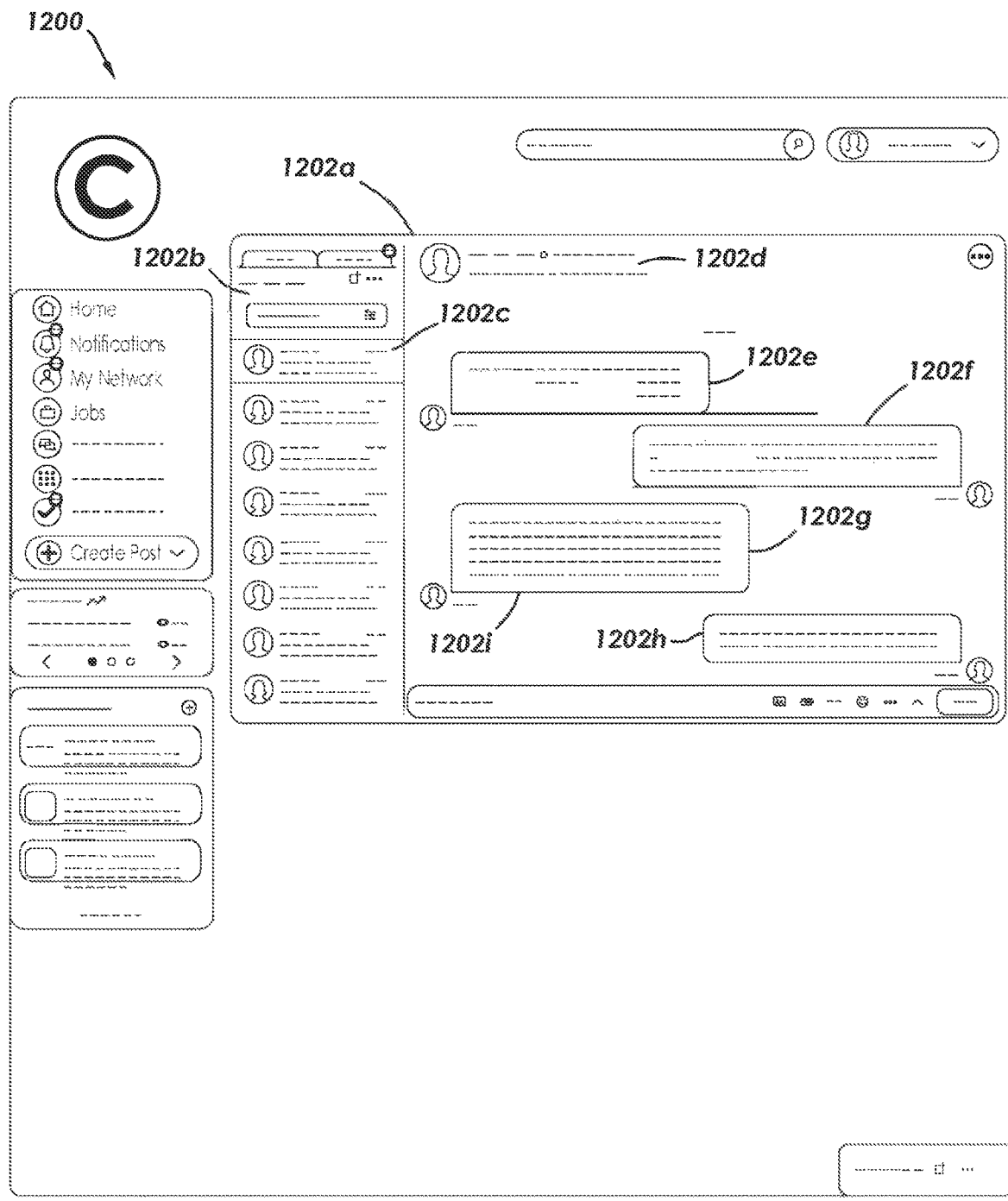
FIG. 12 shows a screen shot of a graphical user interface of a system of the invention in accordance with the various aspects and embodiments of the invention.

Referring now to FIG. 12, a screen shot representation of a graphical user interface 1200 is shown in accordance with various aspects and embodiments of the invention. The graphical user interface 1200 displays the messaging section of the system. Field 1202a shows the overview of the messaging section of the system. There are two different tabs on top on the left window, a regular inbox tab 1202b and the Expand tab 1202c. The purpose of having a separate section for Expand messages and regular messages is that the user's inbox does not clog up with Expand requests from the people who are not in the user's network yet and get in the way of user conversations with the people who are already in the user's network. Once a connection request in Expand is accepted, the message moves out of Expand and goes into the regular inbox. Field 1202a on the right window shows the conversations 1202e, 1202f, 1202g, 1202i between the people requester 1202d and the user.

Figure 13:
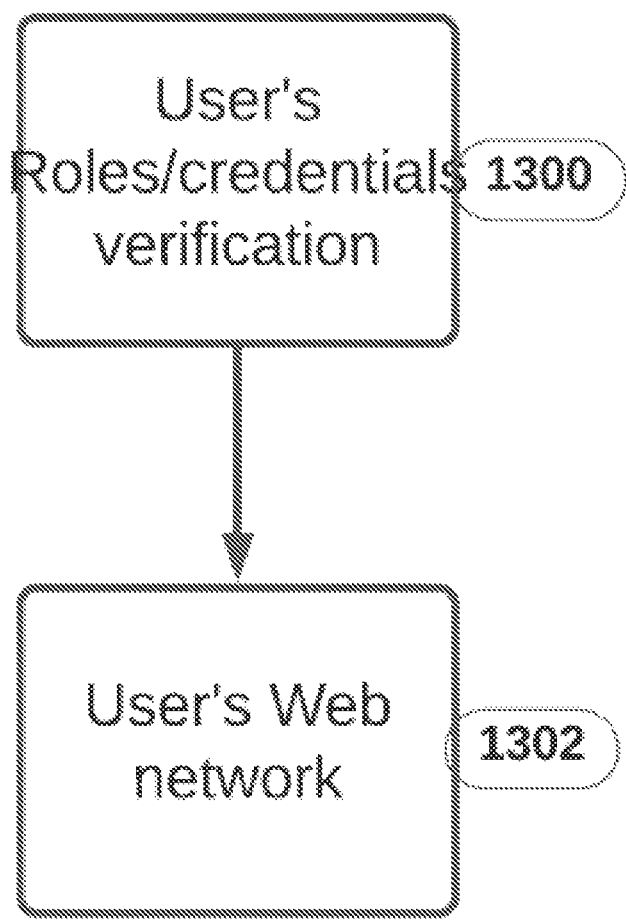
FIG. 13 shows a process in accordance with one or more aspects and embodiments of the invention.

Referring now to FIG. 13, an overview of the system's functionality is shown. At step 1300, the system's roles/credentials verification of an individual is shown. At step 1302, the system's networked individual with credentials is shown.

Figure 14:
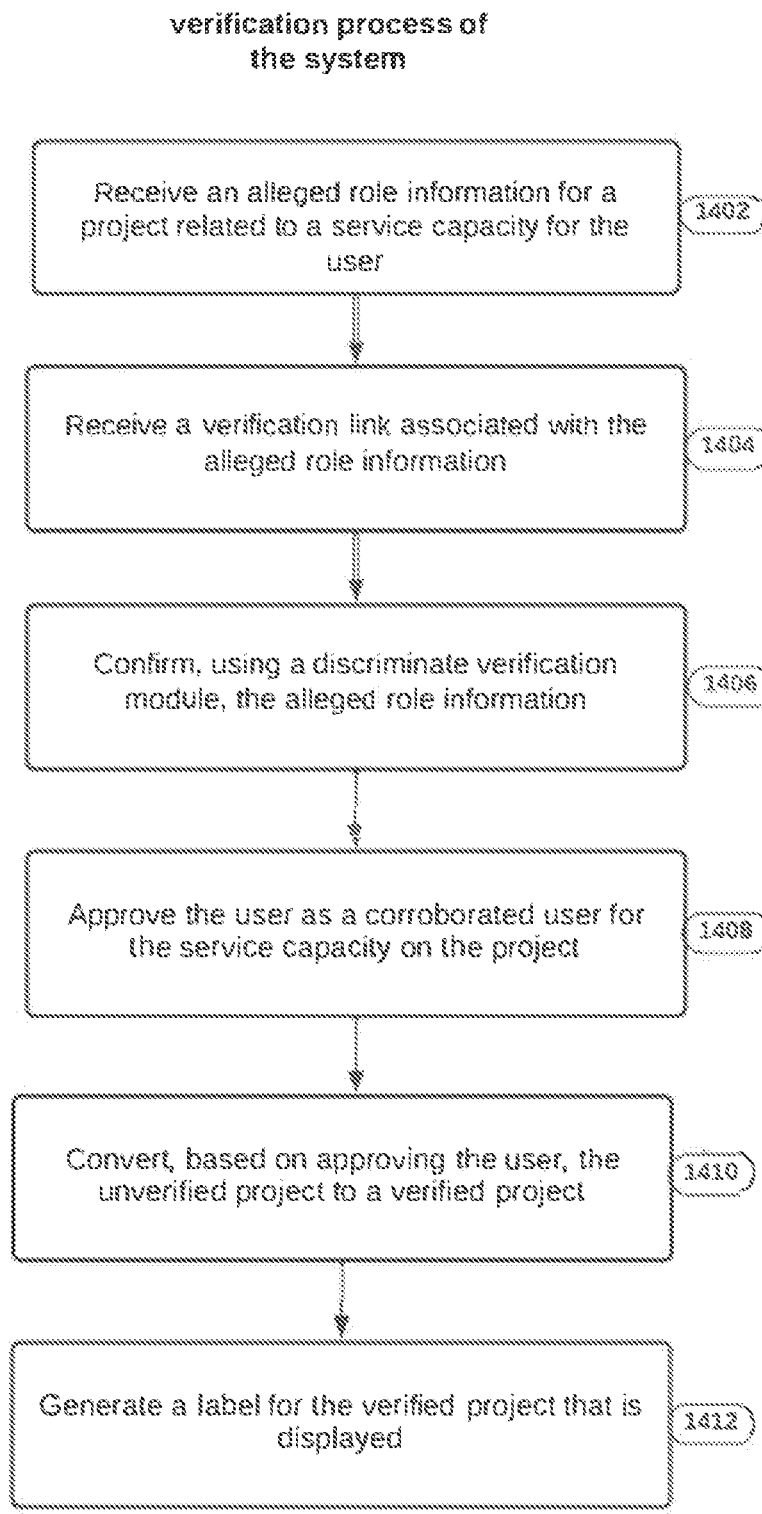
FIG. 14 shows a process in accordance with one or more aspects and embodiments of the invention.

Referring now to FIG. 14, a verification process of the system is shown in accordance with the various aspects and embodiments of the invention. At step 1402, the system receives user's alleged role information for the project related to service capacity for the user—part of receiving the user's alleged role includes an onboarding process or ID verification portion of the system according to one aspect and embodiment of the invention. At step 1404, the system receives a verification link associated with the alleged role information. At step 1404, the system receives a verification link field 114 associated with the alleged role information in the project related to service capacity for the user.

At step 1406, the alleged role information is confirmed. At step 1408, as needed, the system approves the user as a corroborated user for the service capacity. At step 1410, the unverified project is converted to a verified project. At step 1412, the system generates a label for the verified project. As used herein, the term "verified project" means the user's specific role in a particular project is verified. This does not mean that the project itself is being verified. In accordance with one aspect and embodiment of the invention, the project is a completed project outside the system. In accordance with one aspect and embodiment of the invention, the project is a continuing project outside the system. In accordance with one aspect and embodiment of the invention, the project is a selected project from the system pre-defined industry-specific projects that the corroborated user selected and initiated using the system.

Figure 15:
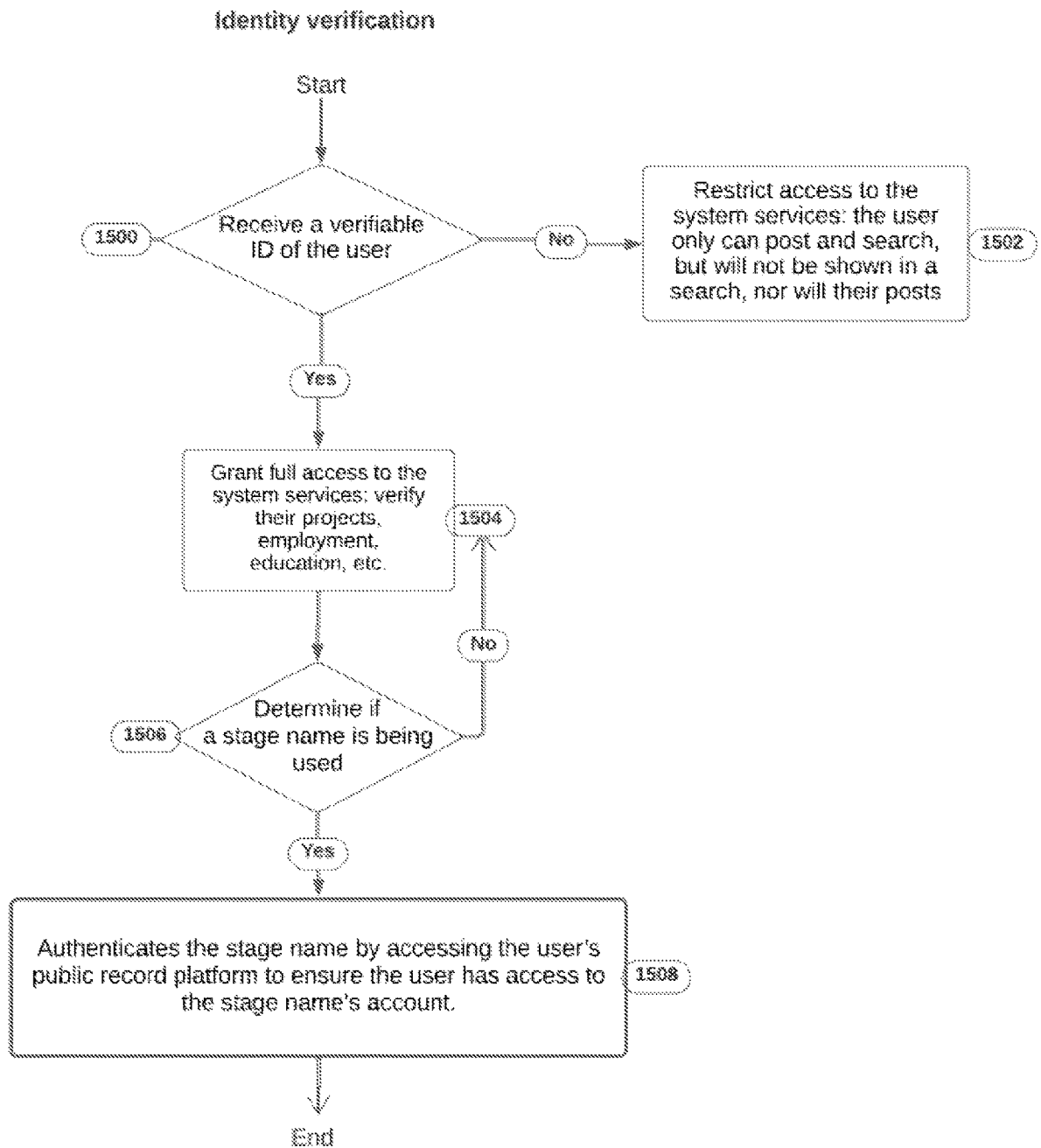
FIG. 15 shows a process for identify verification in accordance with one or more aspects and embodiments of the invention.

Referring now to FIG. 15, the system receives a verifiable ID of the user 1500 in accordance with the various aspects of the invention. The verifiable ID protects the community and ensures that someone does not just claim that they are a specific person and start claiming credits for that particular person's public works. In accordance with one aspect and embodiment of the invention, the system must first verify the user's ID and then allow the user to continue with the system's verification process. If a verifiable ID is not received, then at step 1502 the user's access is restricted by the system. If a verifiable ID is received, then at step 1504 the system allows full access to the services, including verification of project, employment, education, etc.

In accordance with one aspect and embodiment of the invention, if the ID verification process is successful, the user has full access to the system services. For example, the user has access to verify the user's role in different projects, verify the user's employment, education, etc. In accordance with one aspect and embodiment of the invention, if the ID verification process is successful, then at step 1506 the system determines if a stage name is being used. If so, then at step 1508 the system authenticates the stage name by accessing the user's public record platform to ensure the user has access to the stage name's account. In accordance with one aspect and embodiment of the invention, if someone uses a stage name, then there can be an additional layer for authenticating by signing into the user's public record platform via the system to prove that the user has access to user's public stage name's account. Suppose the user does not use the stage name. In that case, based on the user's verifiable ID, the system allows full access to the services 1504, including verification of project, employment, education, etc.

In accordance with one aspect and embodiment of the invention, the user can skip the ID verification portion of the system. If a user skips the verification, then the user does not have access to the system's role verification service in different projects, employment verification, education verification, or anything. The user can post and search; however, the user is not shown in a search, nor is any information that the user's posts.

In accordance with one aspect and embodiment of the invention, the project is a selected project from a system's pre-defined industry-specific projects that the user was selected and initiated inside the system, and now it is completed and has the public record verification link available. The project in the peer verification is the selected project. Only a verified user via a public record link submission (herein a corroborated user) can later verify others for working on the selected project.

Figure 16:
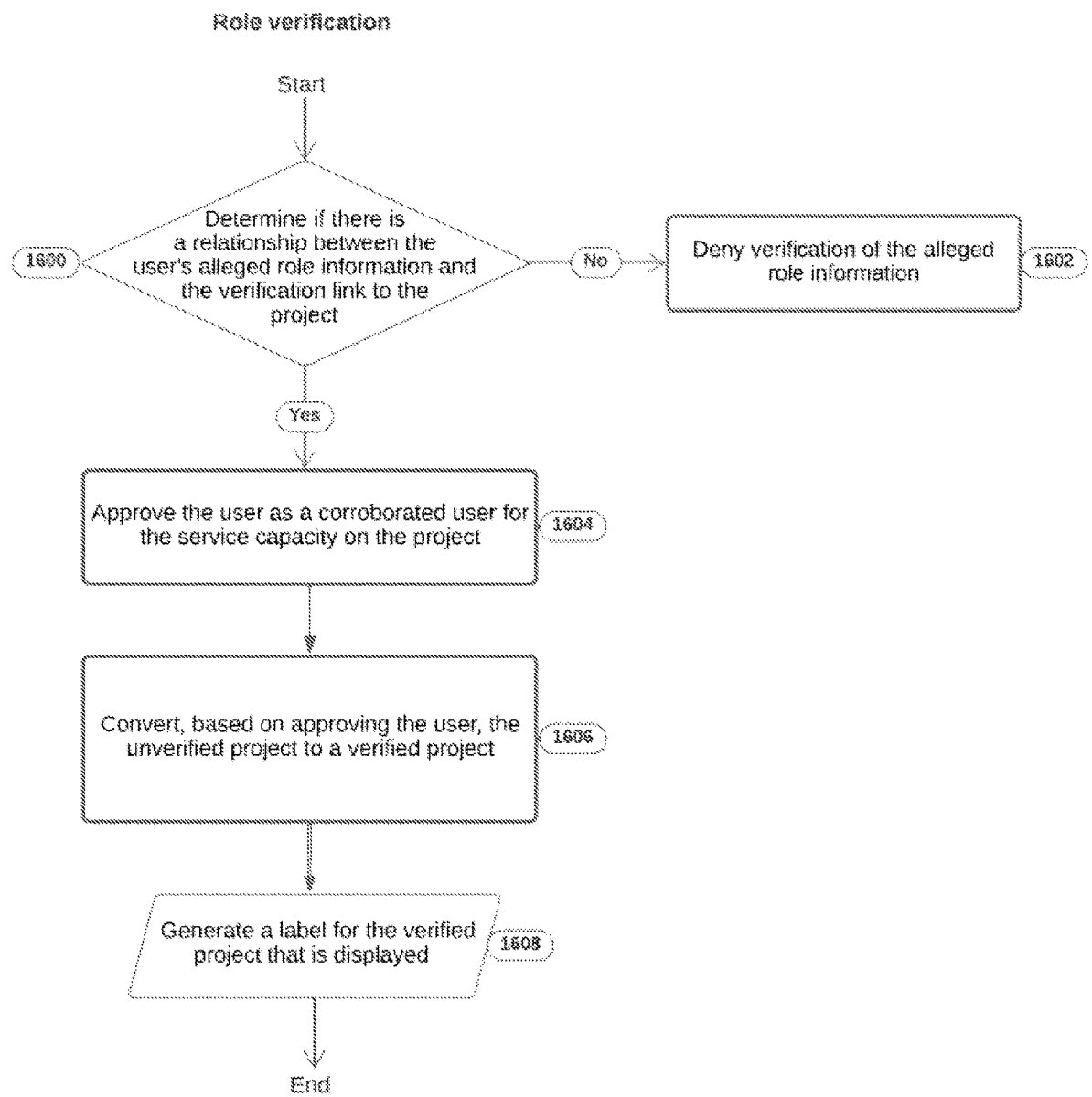
FIG. 16 shows a process for role verification in accordance with one or more aspects and embodiments of the invention.

Referring now to FIG. 16, in accordance with one or more aspects and embodiments of the invention, at step 1600 the system determines if there is a relationship between the user's alleged role information and the verification link to the project exists. If there is no relationship between the user's alleged role information and the verification link to the project, then at step 1602, the system denies verification of the alleged role information because of a lack of relationship between the alleged role information and the verification link. Suppose there is a relationship between the user's alleged role information and the verification link to the project, then at step 1604, the system approves the user as a corroborated user for the service capacity on the project. In accordance with one or more aspects and embodiments of the invention, upon approving the user as the corroborated user by the system, at step 1606, the system converts the status of an unverified role in the project to the verified role in the project (hereinafter verified project). After converting the status of the unverified role in the project to the verified project, at step 1608, the system generates a label that includes the verified project title, the corroborated user's verified role in the project, and at least one public record verification source for the corroborated user's alleged role on the project. The system then at step 1608 displays the label along with the status of each project by check-marking beneath the corroborated user's verified projects.

Referring again to FIG. 16, the system displays the status of each verified project on the corroborated user's profile, on a corroborated user's company's verified list page, and underneath a list of all the people who have been verified for working on the related project displayed on a project page.

Figure 17:
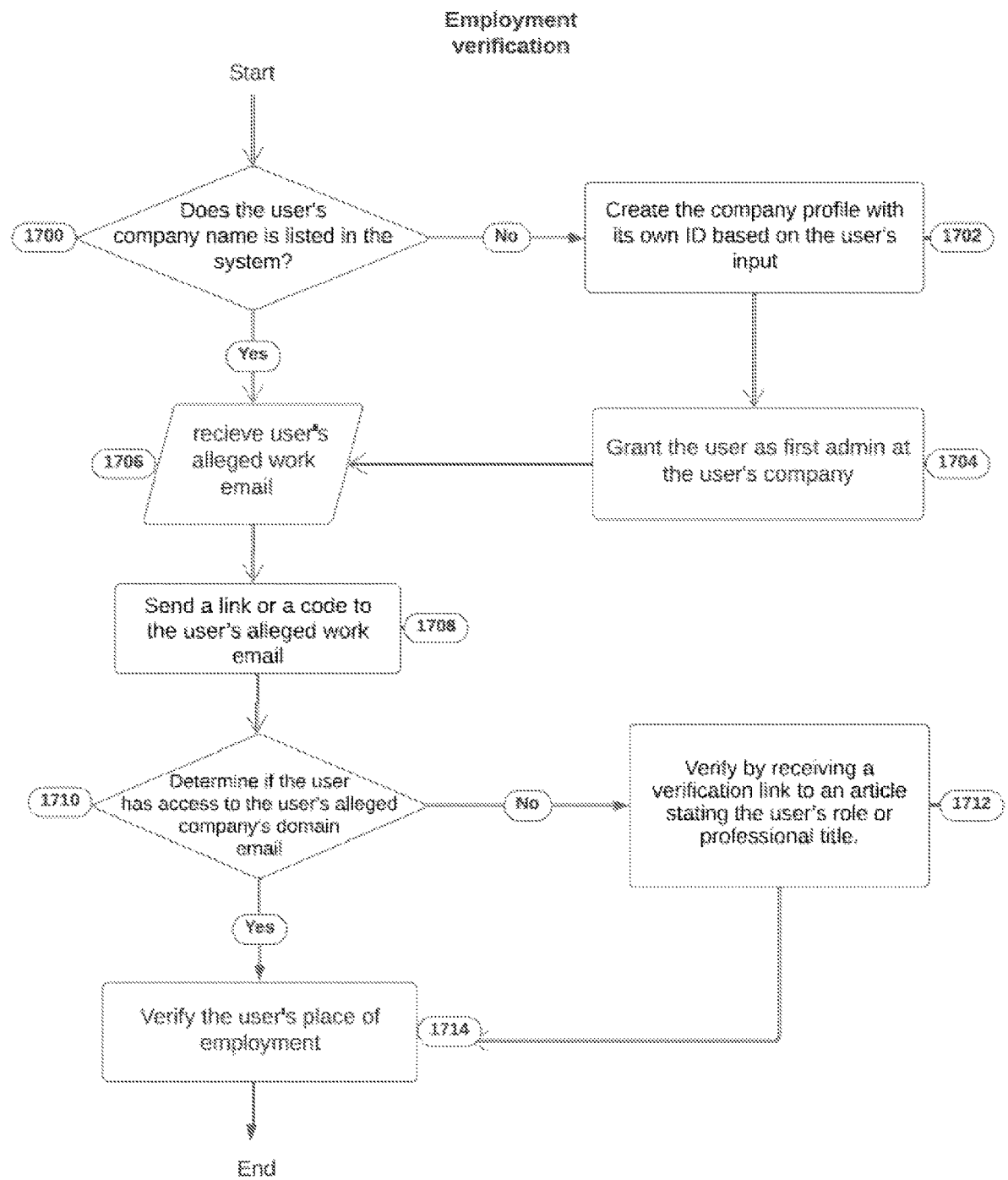
FIG. 17 shows a process for employment verification in accordance with the various aspects and embodiment of the invention.

Referring now to FIG. 17, the process for employment verification is shown in accordance with the various aspects and embodiment of the invention. The employment verification process is a process with which the user gets verification for the user's place of employment from the system (what system?). In accordance with some aspects and embodiments of the invention, at step 1700, the system determines if the user's company name is listed in the system. If the user's company name is not listed in the system, then at step 1702, the system creates the company profile with its own ID based on the user's input. Then at step 1704, the system grants the user as the first admin at the user's company. In accordance with some aspects and embodiments of the invention, either the user's company is listed in the system, or the system creates the company profile and grants the user as first admin at the user's company, the system receives the user's alleged work email at step 1706. In accordance with some aspects and embodiments of the invention, at step 1708, the system sends a link or a code to the user's alleged work email. Once the user clicks the link or enters the code, at step 1710, the system determines that the user has access to the user's alleged company's domain email. Then at step 1714, the system verifies the user's place of employment.

The system can automatically cross-check to see if the email matches the claimed company even if the email domain does not reflect the company's exact name. For example, even if the user claims that the user works at Republic Records but has a Universal Music Group email, the system approves the email. At step 1712, suppose that the system cannot determine the user's access to the user's alleged company's domain email, the system can verify the place of user's employment by receiving a verification link to an article stating the user's role or professional title. In accordance with one aspect and embodiment of the invention, the verification link for employment verification can be a link to an article stating a user's role or professional title.

Figure 18:
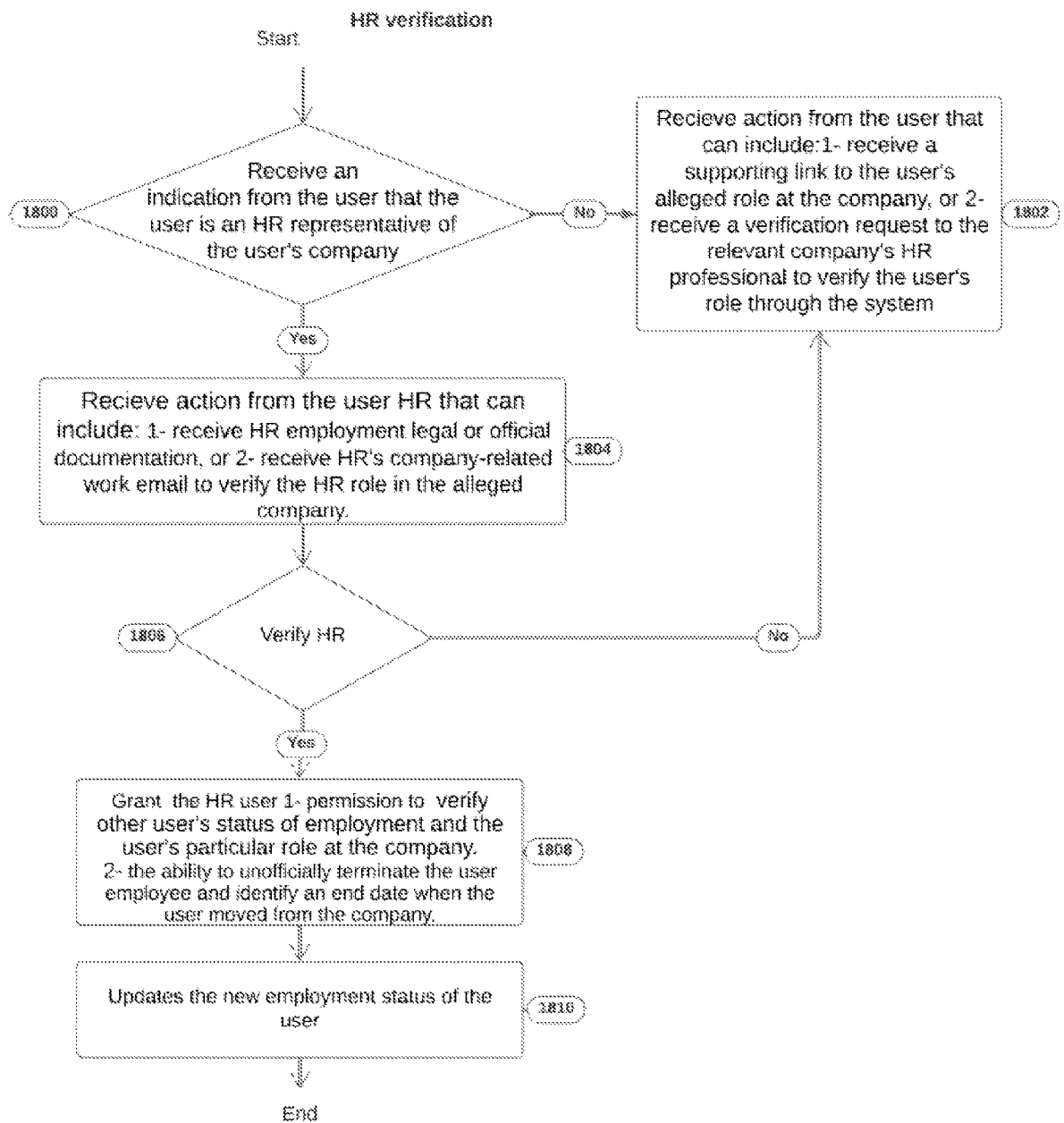
FIG. 18 shows a process for Human Resources (HR) verification in accordance with one or more aspects and embodiments of the invention.

Referring now to FIG. 18, wherein a Human Resources (HR) verification process is shown in accordance with some aspects and embodiments of the invention. The HR verification process is a process that the user gets verification for the user's place of employment, the user's alleged role in the user's alleged company, the user's start date and end date work at the alleged company, and/or the user's job description at the alleged company. In accordance with one aspect and embodiment of the invention, at step 1800, the system determines if the system receives an indication from the user that the user is an HR representative of the user's company. Suppose the user does not indicate that the user is an HR representative of the user's company, or the system cannot verify the user HR role at the company, then at step 1802, the system receives action from the user that can include: 1) receives a supporting link to the user's alleged role at the company, or 2) receives a verification request to the relevant company's HR professional to verify the user's role through the system. The user can send a verification request via sending an email to the HR's company-related work email.

Suppose the system receives an indication from the user that the user is an HR representative of the user's company, then at step 1804, the system receives action from the user HR that can include: 1—receives HR employment legal or official documentation including the HR letterhead with the indication of HR role at the company, or 2—receives HR's company-related work email to verify the HR role in the alleged company. In addition, HR employment legal or official documentation should include a statement that the alleged HR role knows it is fraudulent to falsify this information. HR representatives will likely know the user by the user's name. Therefore, the HR representative of the company will not be the ones verifying the company domain's email as much as the HR will be verifying names.

In accordance with one aspect and embodiment of the invention, at step 1806, when the system confirms that the user is the HR representative of the company, then at step 1808, grants permission to the HR user the ability to verify other user's status of employment and the user's particular role at the company.

In accordance with one aspect and embodiment of the invention, when the system confirms that the user is the HR representative of the company, grants the HR user the ability to unofficially terminate the user employee and identify an end date when the user moved from the company. At step 1810, the system updates the new employment status of the user.

Figure 19:
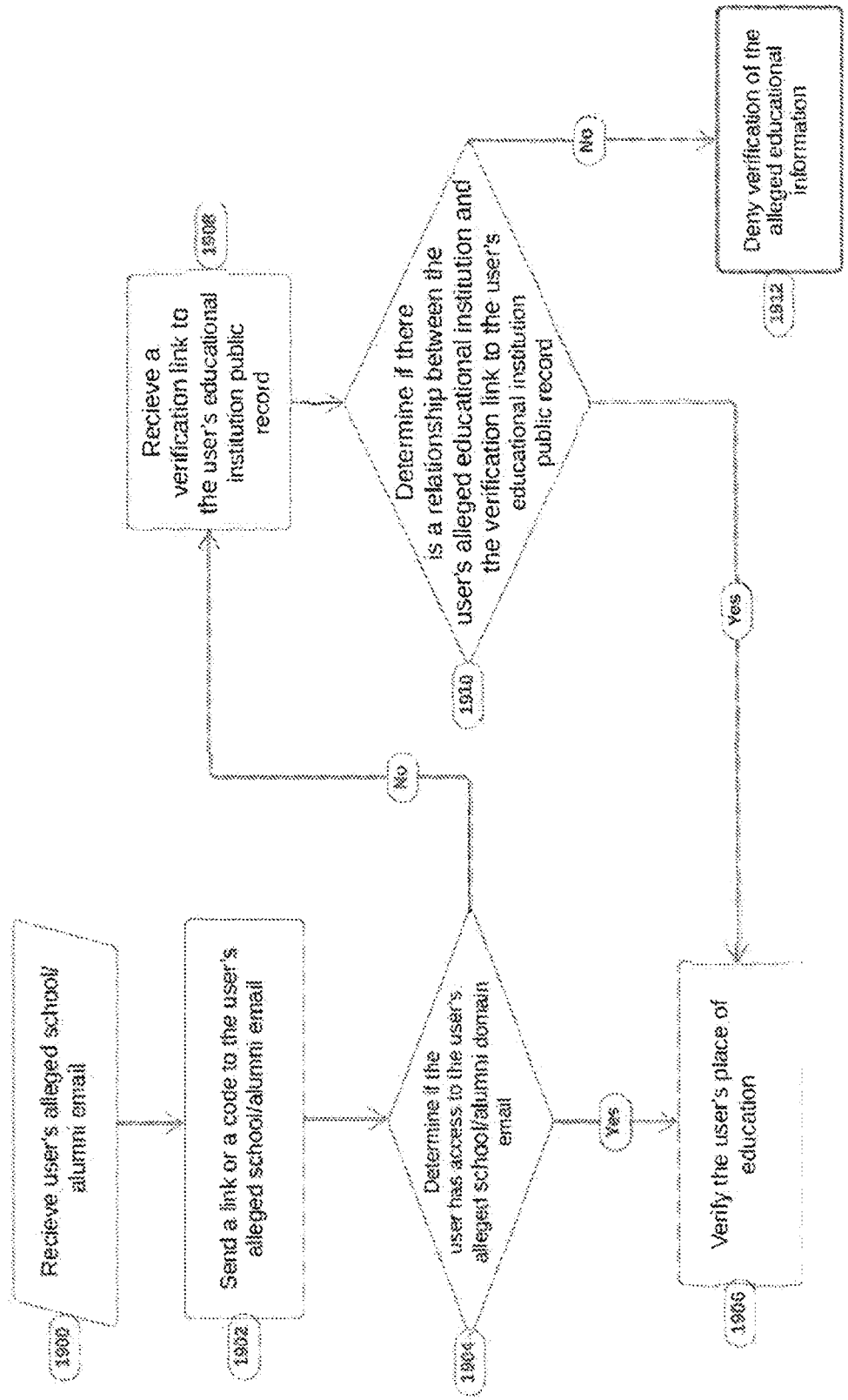
FIG. 19 shows a process for education verification in accordance with one or more aspects and embodiments of the invention.

Referring now to FIG. 19, wherein an education verification process is shown. The education verification process is a process with which the user gets verification for the user's place of education from the system. At step 1900, the system receives user's alleged school/alumni email. Then at step 1902, the system sends a link or a code to the user's alleged school or alumni email. Once the user clicks the link or enters the code, at step 1904, the system determines if the user has access to the user's alleged school's domain email. Then at step 1906, the system verifies the user's place of education. In accordance with one aspect and embodiment of the invention, suppose that the system cannot determine the user's access to the user's alleged school's domain email, the system at step 1908 can verify the place of user's education by receiving a verification link to a user's educational institution public record.

At step 1910, the system determines if there is a relationship between the user's alleged educational institution and the verification link to the user's educational institution public record document. If so, at step 1906, the system verifies the user's place of education. Suppose that there is no relationship between the user's alleged educational institution and the verification link to the user's educational institution public record document then at step 1912, the system denies verification of the alleged educational information.

Figure 20:
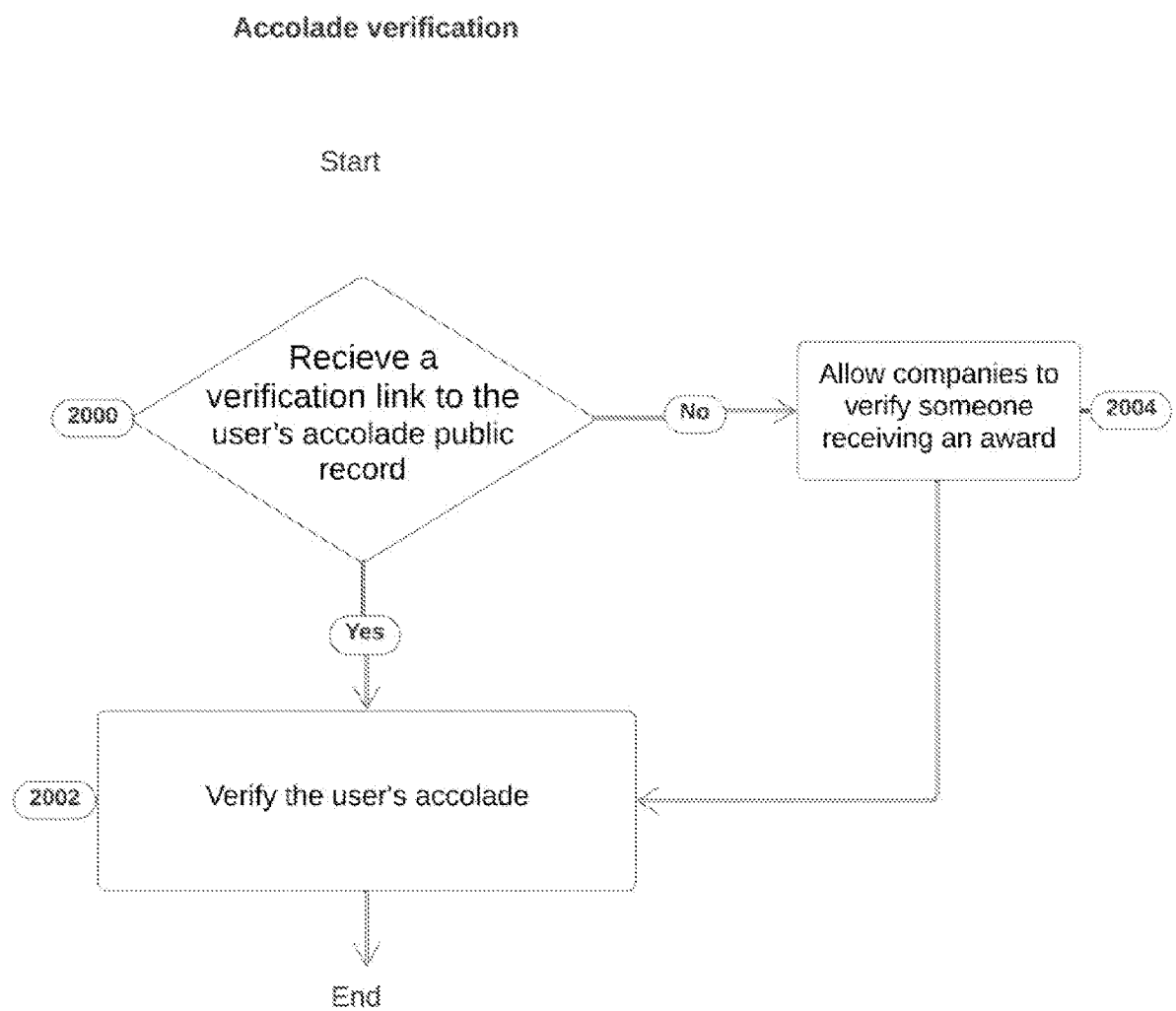
FIG. 20 shows a process for accolade verification in accordance with one or more aspects and embodiments of the invention.

Referring now to FIG. 20, the accolade verification process is shown in accordance with the various aspects and embodiments of the invention. The accolade verification process is a process with which the user gets verification for the user's role in the project that the user won or earned an accolade. For example, the user won song of the year or businesswoman of the year in Billboard mag or Time. The accolade verification can only be verified through public sources by the user inputs the accolade title, for example, Song of the Year, Accolade Committee, Grammys, supporting link, for example, Grammy.com.

At step 2000, the system receives a verification link to the user's accolade public record. The user has the option to include embeddable content such as images and videos from different platforms such as Spotify, Instagram, TikTok, YouTube, Vimeo, Twitter, and the like. If the system receives a verification link to the user's accolade public record, then at step 2002, the system verifies the user's accolade. Suppose the system does not receive a verification link to the user's accolade public record, then at step 2004, the system allows companies to verify someone receiving an award. Peers cannot verify the accolade verification. Most people winning more significant awards will have some sort of supporting link to verify with. Committees will have a portal like educational institutions, unions, and the like. For more minor achievements without much press, the system will allow companies to verify someone receiving an award like a model receiving a hometown beauty pageant award. Grammy committee/Motion Picture Science and Arts and others will be able to verify users, but this is not a peer user verifying the user; the company verifies the user directly. When the user gets verified by the company directly, only the corroborated user's company name can be displayed by the system as the accolade committee. If the user has a verified project already, meaning the user is the corroborated user, and now the corroborated user is receiving an accolade for the same role on the same project, for example, best actress in Squid Game, and the actress already verified her role as an actress on squid game, the corroborated user can select that project to tie to this accolade from a drop-down menu.

In accordance with one aspect and embodiment of the invention, the system has an online critique forum wherein the system user can upload, or link embed up to 10 of the user's creative works and let others poll their favorites. The user can keep the privacy settings private or invite-only or make them open to the public. The user will be able to post the user's creative works on other platforms such as Instagram for the user's fans to be able to partake.

In accordance with one aspect and embodiment of the invention, users can mark themselves as available for unpaid collaboration. Only users who have also marked themselves for unpaid collaboration can see this status on another user's profile. Once a user has marked herself as available for unpaid collaboration, the user cannot change the status back to mark themselves unavailable for unpaid collaboration for precisely 14 days. This feature is to protect up-and-coming creative professionals from being exploited for unpaid labor by larger studios or corporations. This protects creative professionals because if a corporation or large studio marks themselves as available for unpaid collaboration only to see who else is available for unpaid collaboration, they can be outed as exploitative by having this status visible for 14 days. The primary function of this feature is to introduce new, young collaborators to one another in order for them to work on a project together which will benefit both of their portfolios and careers.

The system offers a service wherein it allows users to live-stream content, host private classes, or set up one-on-one meet and greets. The differentiator here is that users will only pay for the total seconds they stay within a stream or closed room instead of just a flat fee or subscription model. A streaming user set a fixed price per minute or flat rate if a viewing user stays the entire time. Whether the rate is per minute or a flat fee, a viewing user will be charged for the total amount of seconds the viewing user stays within a stream once they have exited. For a non-limiting example, the streaming user sets a $0.20 per minute rate. The viewing user clicks to join the stream. If the viewing user does not have an account, the viewing user is prompted to input credit card information. If the streaming user has granted access to preview the content before joining, the viewing user gets a free preview. Once the preview has finished, and the credit card information is verified, the viewing user is put into the stream. If the viewing user stays in the stream for 7.23 minutes, the viewing user will be charged $1.45 in fees.

In accordance with one aspect and embodiment of the invention, if the viewing user does have an account with the System, the viewing user's credit card information can be stored on file. The viewing user can also have the ability to purchase System's coins which transfer into money that is paid to the streaming user.

In accordance with one aspect and embodiment of the invention, the corroborated user has a section on the corroborated user's profile that lists the corroborated user's total upvotes. These upvotes can be granted by peer/collaborator users who have worked on projects with the corroborated user. When a downvote is given, it offsets one upvote. Example: If there are 27 upvotes and the peer/collaborator has worked on a project with the corroborated user and hated the corroborated user's work style, peer/collaborator can give the corroborated user one down vote for that project, and it can offset the corroborated user's upvotes down to 26.

Peer/collaborator can only vote on the corroborated user once per project. Peer/collaborator can amend Peer/collaborator's upvote or downvote to be the opposite. Still, Peer/collaborator cannot vote multiple times on the same corroborated user with whom Peer/collaborator worked on the same project with the same unique ID. Every month Peer/collaborator can be given three upvotes and one downvote to distribute to other corroborated users who have been verified for corroborated user's roles on projects. Peer/collaborator can only upvote or down a corroborated user if Peer/collaborator has shared a project or workplace with the corroborated user. Suppose the corroborated user has 0 upvotes and the Peer/collaborator gives them a downvote before the corroborated user gets an upvote. In that case, the number of upvotes stays 0, and when the corroborated user gets an upvote, that number offsets, and the count remain at 0. Upvotes can never go into the—negatives. Short comments can be associated with an upvote or downvote. A Peer/collaborator providing the vote does not need to provide a comment, but Peer/collaborator can.

When peer/collaborator wants to see comments regarding the corroborated user, peer/collaborator can see three total at a time in a random array. Even if the corroborated user has 40 comments, only three are in a random order display. It's like the Russian roulette of calling data. Upvotes and downvotes are granted anonymously, but the system keeps a record of who created each. Down the line, we may make it a paid feature to see who granted you which vote or to see which project the vote was associated with.

In accordance with one aspect and embodiment of the invention, the system has a metaverse version of the system's network web. The system creates a metaverse wherein the corroborated user can enter this network web, and other users deemed valuable to the corroborated user in some capacity have access to the same room. Users must be deemed valuable to each other in order to be in the same room of this metaverse. It ends up being a virtual networking event wherein users can "walk-around" virtually and interact with all other users currently online. Users in the same room can show other users their content by projecting the content. For example, the corroborated user can project a YouTube video or Spotify song. Suppose the corroborated user is offline from this version of the network web and leaves the corroborated user's creative content for other users to view. For example, the corroborated user recently accomplished works and general stats. In that case, other users can leave a message at corroborated user's marked area stating they would like to connect in the future and suggest times they can be available to meet. Suppose the corroborated user gets a meeting request in this metaverse version of the network web. In that case, the corroborated user can be notified in the System's notifications section even if the corroborated user is offline.

Users can collaborate on virtual projects within this space in the format of classic projects such as songs, movies, visual art and collaborate on NFTs and be able to set revenue split % all within the metaverse. If a classic piece is made, the classic piece can be downloadable, and users can share it anywhere users want after downloading it. For example, users can pitch it to Netflix and/or post it to YouTube. NFTs can be minted and created within this metaverse and be able to be connected to NFT markets such as Opensea via a shared NFT wallet, and once an NFT is sold that was originally created on the system, the system can get a %. This goes beyond just art pieces.

In accordance with one aspect and embodiment of the invention, contractors can meet at the system's metaverse and build virtual buildings to sell as NFTs for people to use on people's real estate plots.

In accordance with one aspect and embodiment of the invention, chefs can take cooking courses that "level up" the chef's cooking skills, thus, making the chefs more desirable to employ in a metaverse restaurant. These courses should also be translatable to the real world. For example, if the chef learns how to make a specific dish in the course, the chef should be able to make the dish outside of the course. For example, engineers can build rockets, cars, and the like to sell as NFTs on other platforms. These examples are possible via shared wallets that apply to various platforms and metaverses.

Users can become a host for the events in the metaverse wherein people can buy tickets with crypto and interact with the experience. The events can be a concert, fashion show, and the like. The system gives users virtual shortcuts on creating a concert or song or movie. In accordance with one aspect and embodiment of the invention, the system gives users virtual shortcuts by taking a regular film production budget and shrinking it down to nominal affordable fraction where users can decide how budget is spent to create the thing users are working on.

In accordance with one aspect and embodiment of the invention, shortcuts also mean if the user wants to make a record but cannot sing, the system has virtual voices that the user can select to layer to make the user's own unique voice for the user's avatar and launch an entire music career for the avatar within the system whose NFTs would be transferable to other metaverses.

In accordance with one aspect and embodiment of the invention, any creative work produced within the system metaverse has a royalty fee in order to view it outside of the system. For example, suppose a user is watching a movie trailer created inside the system by looking at a Billboard for it; that is royalty. Suppose a user uniquely designed hat NFT created within the system used on a mannequin at the store when others view it with their Goggles/Glasses; that is royalty.

In accordance with one aspect and embodiment of the invention, the system metaverse allows the user to create a work within the system metaverse that can be "downloaded." Suppose a user made two hours' worth of content, but it is sped up to 60 seconds or less. In that case, the user can "download" all of the same emotions, information, images, sounds as the user would by viewing a 2-hour movie.

The user creator can sell services in exchange for Crypto/NFTs for services that can be done both within the system metaverse and externally in real life. Users can sign an agreement with other users in the system regarding user's scope of work.

In accordance with one aspect and embodiment of the invention, the system has a section to verify Identification Wallet. Once the user went through the onboarding process or ID verification portion of the system, the system mints a verification card for the user that the user can take that with the user to various other universes. This is to promote safety in other universes; therefore no one starts running illegal activity within other universes, and if they do, their ID is attached. The user's wallet contains all verified information beyond just user's ID. user's wallet contains user's education, employment, and verified projects. The user can hide any of the information user wants. For example, if the user does not feel comfortable with others knowing which city the user lives in, the user can hide that information.

In accordance with one aspect and embodiment of the invention, the ID verification wallet can be attached to a particular avatar and ideally can be needed in order to create the avatar to begin with. Once the user has safely connected, the user can be anyone the user wants with more security and real-world consequences for crime. The user can put the user's verified items such as the user's legal name, verified education, verified employments, verified roles on projects, verified accolades into a wallet that can be shared among different metaverses. The user can choose whether the user wants to show all that information, show some of it, or hide it all. The purpose of this is safety—to ensure that the user's ID is associated with the user's wallet if any real-world illegal or virtually illegal activity transpires within a metaverse. The system leases out the ability for metaverses to use this shared wallet as a first step in allowing users certain permissions to ensure the users' ecosystem is kept safe based on accountability. If the user has a user's ID attached to what the user is doing or saying, the user is less likely to harm others or partake in illegal activity via the system. The system creates a shared identification wallet that can be incorporated into other metaverses for safety standards.

Figure 21:
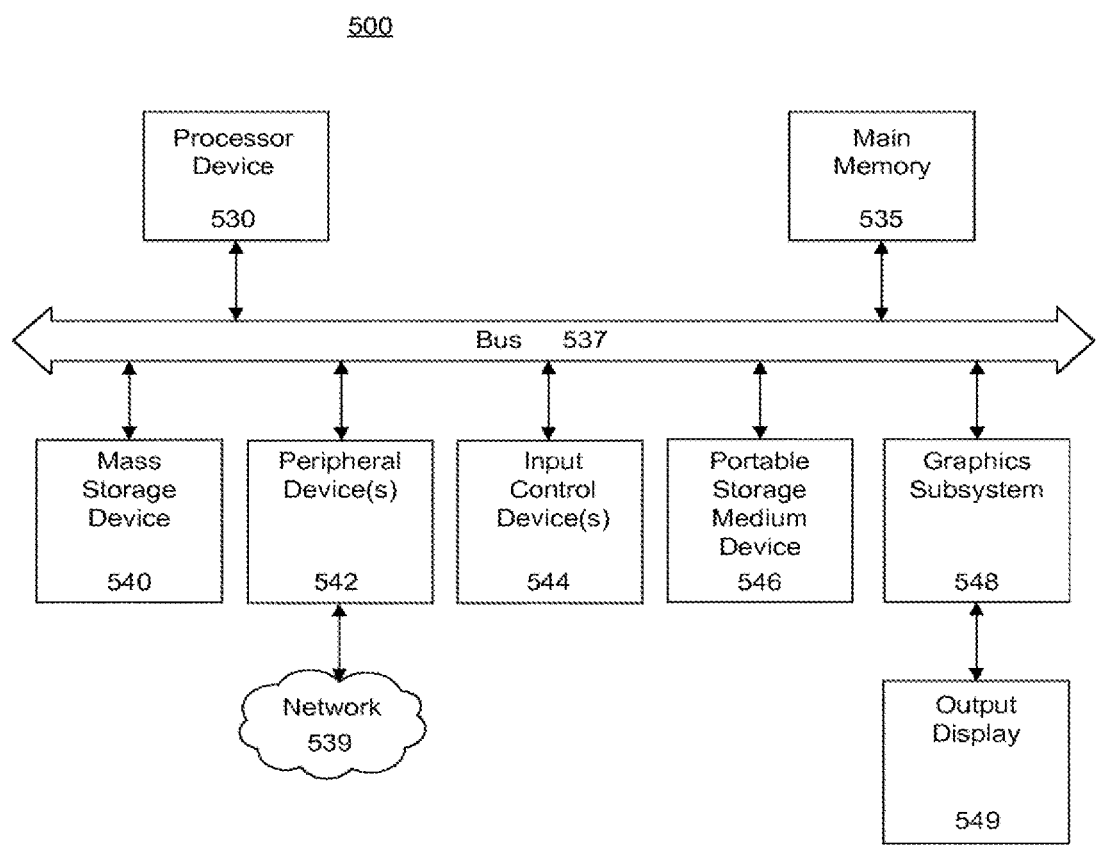
FIG. 21 shows a general and/or special purpose computer, which may be a general and/or special purpose computing device, in accordance with one or more aspect of the invention.

FIG. 21 is a block diagram of a general and/or special purpose computer 5000, which may be a general and/or special purpose computing device, in accordance with some of the example embodiments of the invention. The computer 5000 may be, for example, a user device, a user computer, a client computer and/or a server computer, among other things.

The computer 5000 may include without limitation a processor device 5300, a main memory 5350, and an interconnect bus 5370. The processor device 5300 may include without limitation a single microprocessor, or may include a plurality of microprocessors for configuring the computer 5000 as a multi-processor system. The main memory 5350 stores, among other things, instructions and/or data for execution by the processor device 5300. The main memory 5350 may include banks of dynamic random-access memory (DRAM), as well as cache memory.

The computer 5000 may further include a mass storage device 5400, peripheral device(s) 5420, non-transitory storage medium device(s) 5460, input control device(s) 5440, a graphics subsystem 5480, and/or a display 5490. For explanatory purposes, all components in the computer 5000 are shown in FIG. 5 as being coupled through the bus 5370. However, the computer 5000 is not so limited. Devices of the computer 5000 may be coupled through one or more data transport means. For example, the processor device 5300 and/or the main memory 5350 may be coupled through a local microprocessor bus. The mass storage device 5400, peripheral device(s) 5420, portable storage medium device(s) 5460, and/or graphics subsystem 5480 may be coupled via one or more input/output (I/O) buses. The mass storage device 5400 may be a nonvolatile storage device for storing data and/or instructions for use by the processor device 5300. The mass storage device 5400 may be implemented, for example, with a magnetic disk drive or an optical disk drive. In a software embodiment, the mass storage device 5400 is configured for loading contents of the mass storage device 5400 into the main memory 5350.

The portable storage medium device 5460 operates in conjunction with a nonvolatile portable storage medium, such as, for example, a compact disc read only memory (CD-ROM), to input and output data and code to and from the computer 5000. In some embodiments, the software for storing information may be stored on a portable storage medium, and may be inputted into the computer 5000 via the portable storage medium device 5460. The peripheral device(s) 5420 may include any type of computer support device, such as, for example, an input/output (I/O) interface configured to add additional functionality to the computer 5000. For example, the peripheral device(s) 5420 may include a network interface card for interfacing the computer 5000 with a network 4390.

The input control device(s) 5440 provide a portion of the user interface for a user of the computer 5000. The input control device(s) 5440 may include a keypad and/or a cursor control device. The keypad may be configured for inputting alphanumeric characters and/or other key information. The cursor control device may include, for example, a handheld controller or mouse, a trackball, a stylus, and/or cursor direction keys. In order to display textual and graphical information, the computer 5000 may include the graphics subsystem 5480 and the output display 5490. The output display 5490 may include a cathode ray tube (CRT) display and/or a liquid crystal display (LCD). The graphics subsystem 5480 receives textual and graphical information and processes the information for output to the output display 5490.

Each component of the computer 5000 may represent a broad category of a computer component of a general and/or special purpose computer. Components of the computer 5000 are not limited to the specific implementations provided here.

Software embodiments of the example embodiments presented herein may be provided as a computer program product, or software, that may include an article of manufacture on a machine-accessible or machine-readable medium having instructions. The instructions on the non-transitory machine-accessible machine-readable or computer-readable medium may be used to program a computer system or other electronic device. The machine- or computer-readable medium may include, but is not limited to, floppy diskettes, optical disks, CD-ROMs, and magneto-optical disks or other types of media/machine-readable medium suitable for storing or transmitting electronic instructions. The techniques described herein are not limited to any particular software configuration. They may find applicability in any computing or processing environment. The terms "computer-readable", "machine-accessible medium" or "machine-readable medium" used herein shall include any medium that is capable of storing, encoding, or transmitting a sequence of instructions for execution by the machine and that causes the machine to perform any one of the methods described herein. Furthermore, it is common in the art to speak of software, in one form or another (e.g., program, procedure, process, application, module, unit, logic, and so on), as taking an action or causing a result. Such expressions are merely a shorthand way of stating that the execution of the software by a processing system causes the processor to perform an action to produce a result.

Portions of the example embodiments of the invention may be conveniently implemented by using a conventional general-purpose computer, a specialized digital computer and/or a microprocessor programmed according to the teachings of the present disclosure, as is apparent to those skilled in the computer art. Appropriate software coding may readily be prepared by skilled programmers based on the teachings of the present disclosure.

Some embodiments may also be implemented by the preparation of application-specific integrated circuits, field programmable gate arrays, or by interconnecting an appropriate network of conventional component circuits.

Some embodiments include a computer program product. The computer program product may be a storage medium or media having instructions stored thereon or therein which can be used to control, or cause, a computer to perform any of the procedures of the example embodiments of the invention. The storage medium may include without limitation a floppy disk, a mini disk, an optical disc, a Blu-ray Disc, a DVD, a CD or CD-ROM, a micro-drive, a magneto-optical disk, a ROM, a RAM, an EPROM, an EEPROM, a DRAM, a VRAM, a flash memory, a flash card, a magnetic card, an optical card, nanosystems, a molecular memory integrated circuit, a RAID, remote data storage/archive/warehousing, and/or any other type of device suitable for storing instructions and/or data.

Stored on any one of the computer readable medium or media, some implementations include software for controlling both the hardware of the general and/or special computer or microprocessor, and for enabling the computer or microprocessor to interact with a human user or other mechanism utilizing the results of the example embodiments of the invention. Such software may include without limitation device drivers, operating systems, and user applications. Ultimately, such computer readable media further include software for performing example aspects of the invention, as described above.

Included in the programming and/or software of the general and/or special purpose computer or microprocessor are software modules for implementing the procedures described above.

It should be understood that the accompanying figures are presented for example purposes only. The architecture of the example embodiments presented herein is sufficiently flexible and configurable, such that it may be utilized and navigated in ways other than that shown in the accompanying figures. Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the example embodiments presented herein in any way. It is also to be understood that the procedures recited in the claims need not be performed in the order presented.

The above-disclosed embodiments have been presented for purposes of illustration and to enable one of ordinary skill in the art to practice the disclosure, but the disclosure is not intended to be exhaustive or limited to the forms disclosed. Many insubstantial modifications and variations will be apparent to those of ordinary skill in the art without departing from the scope and spirit of the disclosure. For instance, although the flowchart depicts a serial process, some of the steps/processes may be performed in parallel or out of sequence or combined into a single step/process. The scope of the claims is intended to broadly cover the disclosed embodiments and any such modification. Further, the following clauses represent additional embodiments of the disclosure and should be considered within the scope of the disclosure:

Clause 1, a method for aggregating sources of information and role verification of a user's involvement in a project, the method comprising: receiving an alleged role information for a project related to a service capacity for the user from a plurality of sources; receiving a verification link associated with the alleged role information on the project; confirming, using a discriminate verification module, the alleged role information; approving the user as a corroborated user for the service capacity on the project; converting, based on approving the user, the unverified project to a verified project; generating a label for the verified project that is displayed, wherein the label includes a verified project title, the user's verified role in the verified project and at least one public record verification source; and displaying the label on the user's profile.

Clause 2, the method of clause 1, further comprising allowing full access to one or more services.

Clause 3, the method of clause 1, further comprising: determining if a stage name is being used; and authenticating the stage name by accessing a public record platform to ensure the user has access to a stage name's account.

Clause 4, the method of clause 3, further comprising: authenticating by signing into the user's public record platform to prove that a user has access to user's public stage name's account; and allows full access to one or more services.

Clause 5, the method of clause 1, wherein the project is a selected project from a system's pre-defined industry-specific projects.

Clause 6, the method of clause 1, further comprises determining if there is a relationship between the user's alleged role information and the verification link to the project exists.

Clause 7, the method of clause 6, further comprising denying verification of the alleged role information because of a lack of relationship between the alleged role information and the verification link.

Clause 8, a system comprising: a memory configured to store computer-executable instructions; and a processor, communicatively coupled to the memory, configured to execute the computer-executable instructions to perform operations, the operations comprising: receiving an alleged role information for a project related to a service capacity for the user from a plurality of sources; receiving a verification link associated with the alleged role information on the project; confirming, using a discriminate verification module, the alleged role information; approving the user as a corroborated user for the service capacity on the project; converting, based on approving the user, the unverified project to a verified project; generating a label for the verified project that is displayed, wherein the label includes a verified project title, the user's verified role in the verified project and at least one public record verification source; and displaying the label on the user's profile.

Clause 9, the system of clause 8, further comprising allowing full access to one or more services.

Clause 10, the system of clause 8, further comprising: determining if a stage name is being used; and authenticating the stage name by accessing a public record platform to ensure the user has access to a stage name's account.

Clause 11, the system of clause 10, further comprising: authenticating by signing into the user's public record platform to prove that a user has access to user's public stage name's account; and allows full access to one or more services.

Clause 12, the system of clause 8, wherein the project is a selected project from a system's pre-defined industry-specific projects.

Clause 13, the system of clause 8, further comprises determining if there is a relationship between the user's alleged role information and the verification link to the project exists.

Clause 14, the system of clause 13, further comprising denying verification of the alleged role information because of a lack of relationship between the alleged role information and the verification link.

Clause 15, a non-transitory computer-readable medium, comprising instructions that when executed by a computer processor perform operations, comprising: receiving an alleged role information for a project related to a service capacity for the user from a plurality of sources; receiving a verification link associated with the alleged role information on the project; confirming, using a discriminate verification module, the alleged role information; approving the user as a corroborated user for the service capacity on the project; and converting, based on approving the user, the unverified project to a verified project; generating a label for the verified project that is displayed, wherein the label includes a verified project title, the user's verified role in the verified project and at least one public record verification source; and displaying the label on the user's profile.

Clause 16, the non-transitory machine-readable medium of clause 15, further comprising allowing full access to one or more services.

Clause 17, the non-transitory machine-readable medium of clause 15, further comprising: determining if a stage name is being used; and authenticating the stage name by accessing a public record platform to ensure the user has access to a stage name's account.

Clause 18, the non-transitory machine-readable medium of clause 17, further comprising: authenticating by signing into the user's public record platform to prove that a user has access to user's public stage name's account; and allows full access to one or more services.

Clause 19, the non-transitory machine-readable medium of clause 15, wherein the project is a selected project from a system's pre-defined industry-specific projects.

Clause 20, the non-transitory machine-readable medium of clause 15, further comprises determining if there is a relationship between the user's alleged role information and the verification link to the project exists.

As used herein, the singular forms "a", "an" and "the" are intended to include the plural forms as well, unless the context clearly indicates otherwise. It will be further understood that the terms "comprise" and/or "comprising," when used in this specification and/or the claims, specify the presence of stated features, steps, operations, elements, and/or components, but do not preclude the presence or addition of one or more other features, steps, operations, elements, components, and/or groups thereof. In addition, the steps and components described in the above embodiments and figures are merely illustrative and do not imply that any particular step or component is a requirement of a claimed embodiment.

What is claimed is:

1. A computer-implemented method, comprising:
    verifying, by a network-connected computing system, an alleged role information for a user in a specific project, wherein the alleged role information comprises data relating to any of a specific skill set, experience, credentials, and security clearance;
    said verifying comprising:
        receiving, via the computing system, a verifiable identification of the user;
        authenticating the identification to ensure association with a claimed identity:
        upon authenticating said claimed identity, receiving, via the computing system, the alleged role information for the user in the specific project associated with a service capacity,
            wherein the data of the alleged role information is obtained from a plurality of independent data sources;
        retrieving, via the computing system, a verification link from an input of the user,
            wherein the verification link corresponds to the alleged role information and references at least one external data source;
        analyzing, by executing instructions on a discriminate verification module of the computing system, the alleged role information;
        cross-referencing, by the computing system, the plurality of independent data sources to corroborate the alleged role information in the project;
        modifying, by the computing system, a project status from unverified to verified upon successful corroboration;

generating, by the computing system, a verification label for the verified project, wherein the label includes:
a verified project title,
verified role information in the verified project, and
at least one linked, verifiable public record source; and
displaying, via a graphical user interface of the computing system, the verification label on a user's profile.

2. The method of claim 1, further comprising allowing full access to one or more services.

3. The method of claim 1, further comprising:
determining if a stage name is being used; and
authenticating the stage name by accessing a public record platform to ensure the user has access to a stage name's account.

4. The method of claim 3, further comprising:
authenticating by signing into the user's public record platform to prove that the user has access to the user's public stage name's account; and
allows full access to one or more services.

5. The method of claim 1, wherein the project is a selected project from a system's pre-defined industry-specific projects.

6. The method of claim 1, further comprises determining if there is a relationship between the user's alleged role information and the verification link to the project exists.

7. The method of claim 6, further comprising denying verification of the alleged role information because of a lack of relationship between the alleged role information and the verification link.

8. A system comprising:
a memory configured to store computer-executable instructions; and
a processor, communicatively coupled to the memory, configured to execute the computer-executable instructions to perform operations, the operations comprising:
receiving, via a network-connected computing system, a verifiable identification of a user,
authenticating the identification to ensure association with a claimed identity;
upon authenticating said claimed identity, receiving, via the computing system, an alleged role information for the user in a specific project associated with a service capacity,
wherein data of the alleged role information is obtained from a plurality of independent data sources,
wherein the data related to any of a specific skill set, experience, credentials, and security clearance;
retrieving, via the computing system, a verification link from an input of the user,
wherein the verification link corresponds to the alleged role information and references at least one external data source;
analyzing, by executing instructions on a discriminate verification module of the computing system, the alleged role information;
cross-referencing, by the computing system, the plurality of independent data sources to corroborate the alleged role information in the project;
modifying, by the computing system, a project status from unverified to verified upon successful corroboration;
generating, by the computing system, a verification label for the verified project, wherein the label includes:
a verified project title,
verified role information in the verified project, and
at least one linked, verifiable public record source; and
displaying, via a graphical user interface of the computing system, the verification label on a user's profile.

9. The system of claim 8, further comprising allowing full access to one or more services.

10. The system of claim 8, further comprising:
determining if a stage name is being used; and
authenticating the stage name by accessing a public record platform to ensure the user has access to a stage name's account.

11. The system of claim 10, further comprising:
authenticating by signing into the user's public record platform to prove that the user has access to the user's public stage name's account; and
allows full access to one or more services.

12. The system of claim 8, wherein the project is a selected project from a system's pre-defined industry-specific projects.

13. The system of claim 8, further comprises determining if there is a relationship between the user's alleged role information and the verification link to the project exists.

14. The system of claim 13, further comprising denying verification of the alleged role information because of a lack of relationship between the alleged role information and the verification link.

15. A non-transitory computer-readable medium, comprising instructions that when executed by a computer processor perform operations, comprising:
receiving, via a network-connected computing system, a verifiable identification of a user,
authenticating the identification to ensure association with a claimed identity;
upon authenticating said claimed identity, receiving, via the computing system, an alleged role information for the user in a specific project associated with a service capacity,
wherein data of the alleged role information is obtained from a plurality of independent data sources, wherein the data relates to any of a specific skill set, experience, credentials, and security clearance;
retrieving, via the computing system, a verification link from an input of the user,
wherein the verification link corresponds to the alleged role information and references at least one external data source;
analyzing, by executing instructions on a discriminate verification module of the computing system, the alleged role information;
cross-referencing, by the computing system, the plurality of independent data sources to corroborate the alleged role information in the project;
modifying, by the computing system, a project status from unverified to verified upon successful corroboration;
generating, by the computing system, a verification label for the verified project, wherein the label includes:
a verified project title,
verified role information in the verified project, and
at least one linked, verifiable public record source; and
displaying, via a graphical user interface of the computing system, the verification label on a user's profile.

16. The non-transitory computer-readable medium of claim 15, further comprising allowing full access to one or more services.

17. The non-transitory computer-readable medium of claim 15, further comprising:
   determining if a stage name is being used; and
   authenticating the stage name by accessing a public record platform to ensure the user has access to a stage name's account.

18. The non-transitory computer-readable medium of claim 17, further comprising:
   authenticating by signing into the user's public record platform to prove that the user has access to the user's public stage name's account; and
   allows full access to one or more services.

19. The non-transitory computer-readable medium of claim 15, wherein the project is a selected project from a system's pre-defined industry-specific projects.

20. The non-transitory computer-readable medium of claim 15, further comprises determining if there is a relationship between the user's alleged role information and the verification link to the project exists.

* * * * *